(12) United States Patent
Mizuguchi et al.

(10) Patent No.: US 8,732,173 B2
(45) Date of Patent: May 20, 2014

(54) CLASSIFICATION HIERARCHY REGENERATION SYSTEM, CLASSIFICATION HIERARCHY REGENERATION METHOD, AND CLASSIFICATION HIERARCHY REGENERATION PROGRAM

(75) Inventors: Hironori Mizuguchi, Minato-ku (JP); Dai Kusui, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/382,381

(22) PCT Filed: Apr. 20, 2010

(86) PCT No.: PCT/JP2010/002855
§ 371 (c)(1),
(2), (4) Date: Jan. 5, 2012

(87) PCT Pub. No.: WO2011/004529
PCT Pub. Date: Jan. 13, 2011

(65) Prior Publication Data
US 2012/0109963 A1    May 3, 2012

(30) Foreign Application Priority Data

Jul. 6, 2009 (JP) .................................. 2009-160071

(51) Int. Cl.
*G06F 7/00* (2006.01)
(52) U.S. Cl.
USPC .......................................... 707/737; 707/755
(58) Field of Classification Search
USPC ................... 707/605–704; 382/117
See application file for complete search history.

(56) References Cited

U.S. PATENT DOCUMENTS

| 7,003,442 | B1 | 2/2006 | Tsuda | |
|---|---|---|---|---|
| 2003/0101187 | A1 | 5/2003 | Gaussier et al. | |
| 2004/0181554 | A1 | 9/2004 | Heckerman et al. | |
| 2007/0271278 | A1* | 11/2007 | Acharya | 707/100 |
| 2008/0109454 | A1* | 5/2008 | Willse et al. | 707/100 |

FOREIGN PATENT DOCUMENTS

| JP | 11-096177 A | 4/1999 |
|---|---|---|
| JP | 2000-010996 A | 1/2000 |
| JP | 2003-140942 A | 5/2003 |
| JP | 2005-266866 A | 9/2005 |
| JP | 2008-29938 A | 2/2008 |
| JP | 2008-299382 A | 12/2008 |

\* cited by examiner

*Primary Examiner* — Tony Mahmoudi
*Assistant Examiner* — Tuan-Khanh Phan
(74) *Attorney, Agent, or Firm* — Sughrue Mion, PLLC

(57) ABSTRACT

A classification hierarchy regeneration system is provided, wherein when a new classification hierarchy is generated by restructuring an existing classification hierarchy, a classification hierarchy in view of hierarchical relationship of classifications and a classification hierarchy integrating classifications of the same meaning can be efficiently generated. The clustering means clusters a data group associated with a hierarchical classification, and generating a classification group, i.e., a group obtained by extracting a classification satisfying a condition defined in advance from classifications corresponding to respective data in a cluster. The cooccurrence degree calculation means calculates a degree of cooccurrence of two classifications selected from the classification group. The classification hierarchy regeneration means regenerates the hierarchy of classification based on the classification group and the degree of cooccurrence.

15 Claims, 16 Drawing Sheets

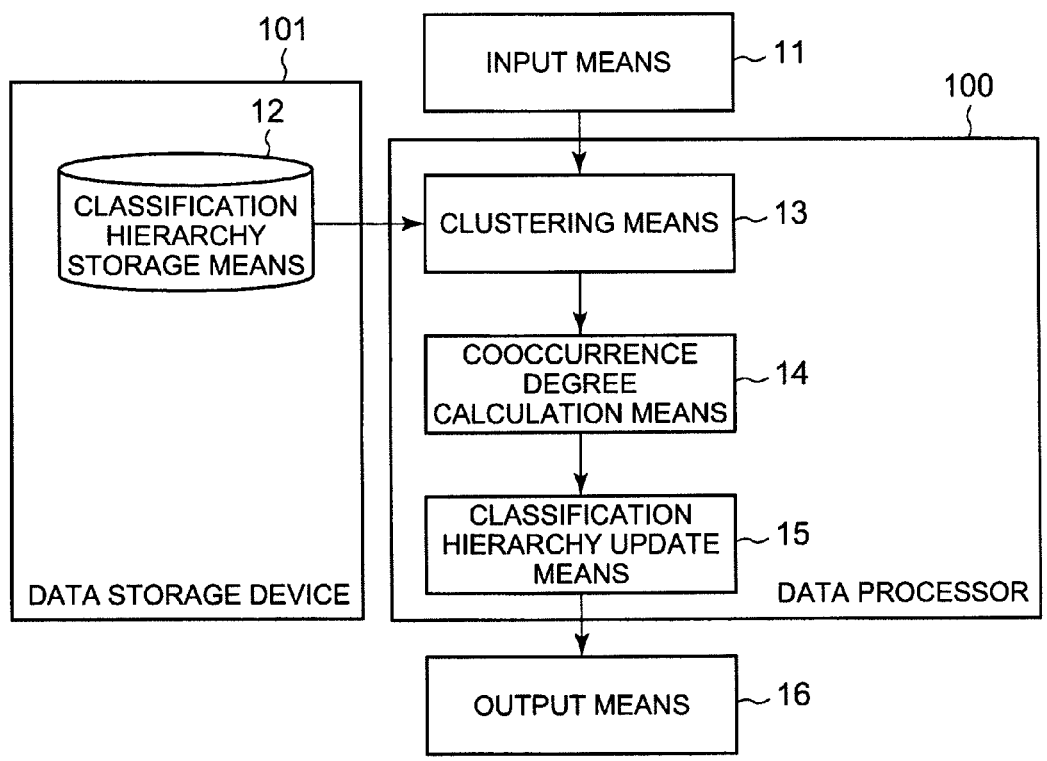

FIG. 5

|  | | CLUSTER | | | |
| --- | --- | --- | --- | --- | --- |
|  | | 1 | 2 | 3 | 4 |
| CLASSIFICATION | A | 0 | 0 | 0 | 0 |
|  | B | 0 | 0 | 0 | 0 |
|  | C | 0 | 0 | 0 | 0 |
|  | D | 0 | 0 | 0 | 0 |
|  | E | 0 | 0 | 0 | 0 |
|  | F | 4 | 5 | 2 | 0 |
|  | G | 30 | 1 | 2 | 5 |
|  | H | 40 | 10 | 1 | 2 |
|  | I | 1 | 10 | 2 | 3 |
|  | J | 0 | 20 | 1 | 2 |
|  | K | 0 | 0 | 0 | 0 |
|  | L | 0 | 0 | 0 | 0 |
|  | M | 0 | 0 | 0 | 0 |
|  | N | 0 | 0 | 0 | 0 |
|  | O | 1 | 0 | 10 | 4 |
|  | P | 2 | 1 | 10 | 2 |
|  | Q | 1 | 0 | 10 | 1 |
|  | R | 1 | 0 | 10 | 2 |
| SUMMATION | | 80 | 47 | 48 | 19 |

FIG. 6

| | | CLUSTER | | | | |
|---|---|---|---|---|---|---|
| | | 1 | 2 | 3 | 3' | 4 |
| CLASSIFICATION | A | 0 | 0 | 0 | 0 | 0 |
| | B | 0 | 0 | 0 | 0 | 0 |
| | C | 0 | 0 | 0 | 0 | 0 |
| | D | 0 | 0 | 0 | 0 | 0 |
| | E | 0 | 0 | 0 | 0 | 0 |
| | F | 4 | 5 | 2 | 2 | 0 |
| | G | 30 | 1 | 2 | 2 | 5 |
| | H | 40 | 10 | 1 | 1 | 2 |
| | I | 1 | 10 | 2 | 2 | 3 |
| | J | 0 | 20 | 1 | 1 | 2 |
| | K | 0 | 0 | 0 | 0 | 0 |
| | L | 0 | 0 | 0 | 0 | 0 |
| | M | 0 | 0 | 0 | 0 | 0 |
| | N | 0 | 0 | 0 | 0 | 0 |
| | O | 1 | 0 | 10 | 0 | 4 |
| | P | 2 | 1 | 10 | 0 | 2 |
| | Q | 1 | 0 | 0 | 10 | 1 |
| | R | 1 | 0 | 0 | 10 | 2 |
| SUMMATION | | 80 | 47 | 28 | 28 | 19 |

FIG. 7

| GROUP | CLASSIFI-CATION 1 | CLASSIFI-CATION 2 | COOCCURRENCE SCORE 1 | COOCCURRENCE SCORE 2 |
|---|---|---|---|---|
| 1 | G | H | 0.9 | 0.2 |
| 2 | H | I | 0.2 | 0.7 |
| | H | J | 0.2 | 0.9 |
| | I | J | 0.8 | 0.7 |
| 3 | O | P | 0.7 | 0.8 |
| 3' | Q | R | 0.5 | 0.6 |

FIG. 12

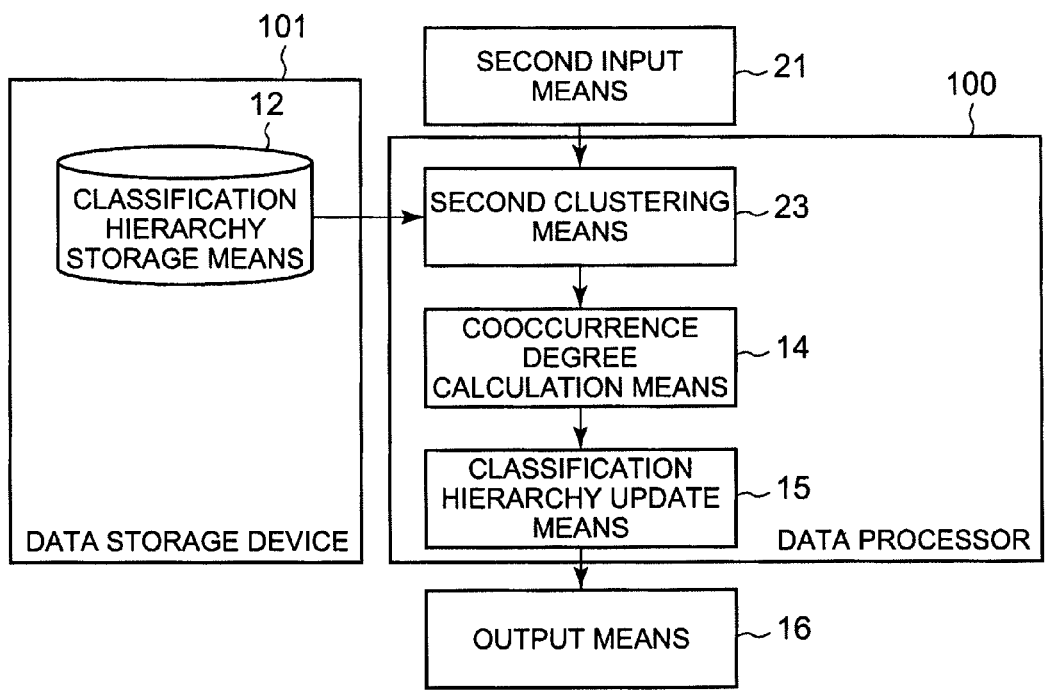

FIG. 13

```
NAME
  CLUSTERING DEVICE
APPLICANT
  XX CORPORATION, YY CORPORATION
ABSTRACT
  OBTAINING THE FEATURES OF AN ANALYSIS TARGET DURING CLUSTERING
  PROCESS ...
CLAIM
  CLAIM 1  A CLUSTERING DEVICE USING A CHARACTERISTIC TERM, ...
BACKGROUND ART
  IN THE PAST, A CLUSTERING DEVICE OBTAINS A CHARACTERISTIC ANALYSIS
  RESULT ...
PROBLEMS TO BE SOLVED
  THE FIRST PROBLEM LIES IN THAT IT IS DIFFICULT TO OBTAIN A CHARACTERISTIC
  ANALYSIS RESULT ...
OBJECT OF THE INVENTION
  IT IS AN OBJECT OF THIS INVENTION TO ... THAT IS MADE TO SOLVE THE ABOVE
  PROBLEMS.
SOLUTION MEANS
  ...
```

FIG. 16

| DATA | CLASSIFICATION |
|---|---|
| HEALTH MANAGEMENT METHOD FOR FAMILY<br>IT IS A BURDEN FOR HOUSEWIVES WHO ALWAYS MANAGE THE HEALTH OF THE FAMILY MEMBERS TO THINK OF DAILY RECIPES. FOR HOUSEWIVES WHO WANT TO MANAGE THE HEALTH AND MAKE MENUS MORE EASILY, A NEW HEALTH MANAGEMENT METHOD HAS BEEN PRESENTED BY UNIVERSITY XX ... | FAMILY, MEDICINE, HEALTH |
| CUTTING EDGE OF ANTI-AGING MEDICINE<br>ANTI-AGING MEDICINE HAS BEEN DEVELOPED AS "MEDICINE FOR ETERNALLY MAINTAINING YOUTHFULNESS BY DELAYING THE PROCESS OF GROWING OLD". TODAY, WE WOULD LIKE TO LET YOU KNOW THE LATEST TREND. PROFESSOR XX OF UNIVERSITY YY, AS THE LEADING EXPERT IN THE FIELD OF ANTI-AGING, ... | MEDICINE, HEALTH |
| KIDNEY TRANSPLANTATION THAT SAVES LIFE<br>IN JAPANESE MEDICINE, IN PRINCIPLE, AN ORGAN IS RECEIVED FROM A RELATIVE WHEN A PATIENT UNDERGOES LIVE-DONOR RENAL TRANSPLANTATION. HOWEVER, IT IS NOT EASY TO FIND AN APPROPRIATE PERSON, AND THEREFORE, MANY PATIENTS GIVE UP TRANSPLANTATION OPERATION IN JAPAN, AND UNDERGOES OPERATION ABROAD. MR. XX ALSO ... | RELATIVES, TRANSPLANTATION, MEDICINE |
| ... | ... |

FIG. 18

| | | CLUSTER | | | |
|---|---|---|---|---|---|
| | | 1 | 2 | 3 | 4 |
| CLASSIFICATION | MAIN CATEGORY | 0 | 0 | 0 | 0 |
| | SOCIETY | 0 | 0 | 0 | 0 |
| | LIFE | 0 | 0 | 0 | 0 |
| | POLITICS | 0 | 0 | 0 | 0 |
| | MEDICINE | 1 | 0 | 0 | 0 |
| | FAMILY | 5 | 4 | 2 | 0 |
| | HOME | 1 | 0 | 2 | 20 |
| | HEALTH | 0 | 15 | 3 | 3 |
| | DIPLOMACY | 0 | 1 | 2 | 3 |
| | ADMINISTRATION | 0 | 0 | 20 | 0 |
| | MEDICINE | 0 | 20 | 0 | 0 |
| | TRANSPLANTATION | 20 | 20 | 0 | 0 |
| | FAMILY LAW | 0 | 0 | 0 | 0 |
| | RELATIVES | 20 | 0 | 0 | 0 |
| | BABY AND CHILD CARE | 0 | 1 | 2 | 10 |
| | DIPLOMAT | 1 | 2 | 10 | 0 |
| | DIPLOMATIC HISTORY | 0 | 0 | 0 | 0 |
| | GOVERNMENT | 2 | 1 | 5 | 0 |
| | PUBLIC OFFICE | 0 | 0 | 0 | 0 |

FIG. 19

|  |  | CLUSTER | | | | |
| --- | --- | --- | --- | --- | --- | --- |
|  |  | 1 | 1' | 2 | 3 | 4 |
| CLASSIFICATION | MAIN CATEGORY | 0 | 0 | 0 | 0 | 0 |
|  | SOCIETY | 0 | 0 | 0 | 0 | 0 |
|  | LIFE | 0 | 0 | 0 | 0 | 0 |
|  | POLITICS | 0 | 0 | 0 | 0 | 0 |
|  | MEDICINE | 1 | 1 | 0 | 0 | 0 |
|  | FAMILY | 5 | 5 | 4 | 2 | 0 |
|  | HOME | 1 | 1 | 0 | 2 | 20 |
|  | HEALTH | 0 | 0 | 10 | 1 | 2 |
|  | DIPLOMACY | 0 | 0 | 1 | 2 | 3 |
|  | ADMINISTRATION | 0 | 0 | 0 | 20 | 0 |
|  | MEDICINE | 0 | 0 | 20 | 0 | 0 |
|  | TRANSPLANTATION | 20 | 0 | 20 | 0 | 0 |
|  | FAMILY LAW | 0 | 0 | 0 | 0 | 0 |
|  | RELATIVES | 0 | 20 | 0 | 0 | 0 |
|  | BABY AND CHILD CARE | 0 | 0 | 1 | 2 | 10 |
|  | DIPLOMAT | 1 | 1 | 2 | 10 | 0 |
|  | DIPLOMATIC HISTORY | 0 | 0 | 0 | 0 | 0 |
|  | GOVERNMENT | 2 | 2 | 1 | 5 | 0 |
|  | PUBLIC OFFICE | 0 | 0 | 0 | 0 | 0 |

FIG. 20

| GROUP | CLASSIFICATION 1 | CLASSIFICATION 2 | COOCCURRENCE SCORE 1 | COOCCURRENCE SCORE 2 |
| --- | --- | --- | --- | --- |
| 1 | TRANSPLANTATION | | | |
| 1' | RELATIVES | | | |
| 2 | HEALTH | MEDICINE | 0.77 | 0.8 |
| 2 | HEALTH | TRANSPLANTATION | 0.4 | 0.6 |
| 2 | MEDICINE | TRANSPLANTATION | 0.3 | 0.5 |
| 3 | ADMINISTRATION | DIPLOMAT | 0.2 | 0.7 |
| 4 | HOME | BABY AND CHILD CARE | 0.8 | 0.7 |

CLASSIFICATION HIERARCHY REGENERATION SYSTEM, CLASSIFICATION HIERARCHY REGENERATION METHOD, AND CLASSIFICATION HIERARCHY REGENERATION PROGRAM

CROSS REFERENCE TO RELATED APPLICATIONS

This application is a National Stage of International Application No. PCT/JP2010/002855 filed Apr. 20, 2010, which claims priority from Japanese Patent Application No. 2009-160071, filed on Jul. 6, 2009, the contents of all of which are incorporated herein by reference in their entirety.

TECHNICAL FIELD

This invention relates to a classification hierarchy regeneration system, a classification hierarchy regeneration method, and a classification hierarchy regeneration program for generating a new classification hierarchy by restructuring a hierarchical classification.

BACKGROUND ART

PLT 1 describes a data dividing method, wherein when multidimensional data are divided with items having a hierarchical structure, the data are divided into groups suitable for analytical purposes. When a data dividing device described in PLT 1 receives a data group and a classification hierarchy of the data group, and the data dividing device outputs a classification hierarchy obtained by deleting uncharacteristic hierarchy from the classification hierarchy, based on the distribution of the received data group. More specifically, determination means adopts a particular classification as a dividing target, and determines an attribute indicating whether a dividing target group is characteristic or not by performing statistical test based on the distribution of the data group (dividing target group). Subsequently, the dividing means divides the dividing target group into a child group that belongs to a child class, based on the determination result, and adopts the child group as a new dividing target. Then, integration means integrates the uncharacteristic child group to the parent group based on the attribute of the determination result. More specifically, the integration means deletes the uncharacteristic hierarchy, and leaves only the characteristic hierarchy. For this reason, classification up to the characteristic child class can be obtained by following the output classification hierarchy from the parent classification in order.

PLT 2 describes a term dictionary generation method for outputting relationship between terms based on input document data. In the term dictionary generation method described in PLT 2, first, related terms are selected based on each term and position information of the document data. Subsequently, a graph is generated in which the terms and the related words are shown as nodes. Further, for a combination of any two nodes in the graph, a cooccurrence statistical amount is calculated, and in addition, the degree of similarity is calculated from a synonym dictionary and other document data. Then, the graph is converted based on a conversion rule using the cooccurrence statistical amount and the value of the degree of similarity.

PLT 3 describes a document organizing device automatically classifying, with high accuracy, a large amount of document groups accumulated in an information processor according to the features thereof. The document organizing device described in PLT 3 defines a certainty factor conf (H→B) and a support sup (H→B) representing an cooccurrence frequency of a keyword pair (H, B). Then, an XY plane defined by point (X, Y)=(conf (kw→wi), conf (wi→kw)) is divided into five, and hierarchical relationships, equivalence relationships, and association relationships are determined.

PLT 4 describes a classification system generation device automatically establishes a classification system of a hierarchical structure from a flat classification frame. The classification system generation device described in PLT 4 generates clusters by clustering, starting from a non-hierarchical type (i.e., flat classification frame). Then, these generated clusters are adopted as upper classification frames, and a hierarchical structure classification system is prepared. After integrating with other clusters with attention given to upper classification frames (i.e., clusters) of which classification accuracy is less than a reference value, the hierarchy is extended by re-clustering. In the classification system generation device described in PLT 4, when the classification accuracy of the existing classification system is less than the reference value, or when the classification system is corrected according to the situation, the classification system of the document classification unit is stored to the classification system storage unit and adopted as an optimization target. Then, the classification is evaluated and changed based on a classified document input from a document input unit and a sample document representing the situation, so that the classification accuracy is improved.

CITATION LIST

Patent Literature

PLT 1: Japanese Patent Application Laid-Open No. 2008-299382 (paragraphs 0027, 0047 to 0048, 0079)

PLT 2: Japanese Patent Application Laid-Open No. H11-96177 (paragraphs 0015 to 0017, FIG. 1)

PLT 3: Japanese Patent Application Laid-Open No. 2005-266866 (paragraphs 0021, 0051, FIG. 4)

PLT 4: Japanese Patent Application Laid-Open No. 2000-10996 (paragraphs 0081, 0084 to 0085, FIG. 11)

SUMMARY OF INVENTION

Technical Problem

In the data dividing method described in PLT 1, the uncharacteristic hierarchy is deleted, and therefore, there is a problem in that the hierarchy to be deleted cannot be classified. For example, in the data dividing method described in PLT 1, when a viewpoint suitable for the data characteristics resides in the classification hierarchy, there would be no problem, but when there is no viewpoint suitable for the data characteristics, it is impossible to obtain appropriate classification hierarchy. Even in such hierarchy that is not to be classified, it is desirable to be able to generate a classification in view of the hierarchical relationship of the hierarchy and classification integrating the classifications of the same meaning (for example, when classification 1 and classification 2 are allocated to completely the same data, they are integrated into one as a classification of the same meaning).

In the data dividing method described in PLT 1, it is necessary to determine all the hierarchies in order to determine whether each hierarchy is characteristic or not, which leads to a problem of inefficiency. Likewise, even in the term dictionary generation method described in PLT 2, it is necessary to calculate the cooccurrence statistical amount and the degree of similarity in the relationship between the terms corresponding to all the nodes in order to convert the relationship between the nodes, which leads to a problem of inefficiency. Also, in the document organizing device described in PLT 3, a directory file is generated based on all the stored keywords, which leads to a problem of inefficiency.

In the classification system generation device described in PLT 4, the classification frame is made into hierarchy by repeating clustering of the classification frame based on the degree of association with the sample document. However, since the degree of association is determined based on the occurrence frequency of the word of each cluster, there is a problem in that the document classification device described in PLT 4 cannot perform classification in view of the hierarchical relationship of the hierarchy and classification integrating classifications of the same meaning.

Accordingly, it is an object of this invention to provide a classification hierarchy regeneration system, a classification hierarchy regeneration method, and a classification hierarchy regeneration program, wherein when a new classification hierarchy is generated by restructuring an existing classification hierarchy, a classification hierarchy in view of hierarchical relationship of classifications and a classification hierarchy integrating classifications of the same meaning can be efficiently generated.

Solution to Problem

A classification hierarchy regeneration system according to this invention includes clustering means for clustering a data group associated with a hierarchical classification, and generating a classification group, i.e., a group obtained by extracting a classification satisfying a condition defined in advance from classifications corresponding to respective data in a cluster, cooccurrence degree calculation means for calculating a degree of cooccurrence of two classifications selected from the classification group, and classification hierarchy regeneration means for regenerating a hierarchy of the classification, based on the classification group and the degree of cooccurrence.

A classification hierarchy regeneration method according to this invention comprising; clustering a data group associated with a hierarchical classification, and generating a classification group, i.e., a group obtained by extracting a classification satisfying a condition defined in advance from classifications corresponding to respective data in a cluster, calculating a degree of cooccurrence of two classifications selected from the classification group, and regenerating a hierarchy of the classification, based on the classification group and the degree of cooccurrence.

A classification hierarchy regeneration program according to this invention causes a computer to execute clustering processing for clustering a data group associated with a hierarchical classification, and generating a classification group, i.e., a group obtained by extracting a classification satisfying a condition defined in advance from classifications corresponding to respective data in a cluster, cooccurrence degree calculation processing for calculating a degree of cooccurrence of two classifications selected from the classification group, and classification hierarchy regeneration processing for regenerating a hierarchy of the classification, based on the classification group and the degree of cooccurrence.

Advantageous Effects of Invention

According to this invention, when a new classification hierarchy is generated by restructuring an existing classification hierarchy, a classification hierarchy in view of hierarchical relationship of classifications and a classification hierarchy integrating classifications of the same meaning can be efficiently generated.

BRIEF DESCRIPTION OF DRAWINGS

FIG. 1 is a block diagram illustrating an example of a classification hierarchy regeneration system according to the first embodiment of this invention.

FIG. 2 is an explanatory diagram illustrating an example of a data group input to input means 11 and classifications thereof.

FIG. 5 is an explanatory diagram illustrating an example of a cross-tabulation table.

FIG. 6 is an explanatory diagram illustrating an example of a cross tabulation table showing divided result.

FIG. 7 is an explanatory diagram illustrating an example of a calculation result of the degree of cooccurrence.

FIG. 12 is a block diagram illustrating an example of a classification hierarchy regeneration system according to the second embodiment of this invention.

FIG. 13 is an explanatory diagram illustrating an example of data with a structure.

FIG. 16 is an explanatory diagram illustrating an example of a data group received by the input means 11.

FIG. 18 is an explanatory diagram illustrating an example of a cross-tabulation table.

FIG. 19 is an explanatory diagram illustrating an example of a result obtained by dividing a cross-tabulation table.

FIG. 20 is an explanatory diagram illustrating an example of a calculation result of cooccurrence scores.

DESCRIPTION OF EMBODIMENTS

Figure 3:
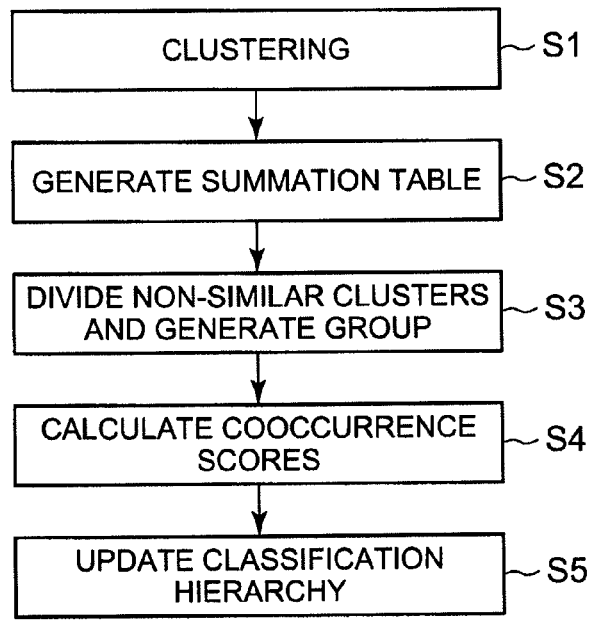
FIG. 3 is a flowchart illustrating an example of operation of a data processor 100 according to the first embodiment.

Embodiments of this invention will be hereinafter explained with reference to drawings.
First Embodiment FIG. 1 is a block diagram illustrating an example of a classification hierarchy regeneration system according to the first embodiment of this invention. A classification hierarchy regeneration system according to this embodiment includes a data processor 100, a data storage device 101, input means 11, and output means 16. The input means 11 is, for example, an input device such as a keyboard, but the form of the input means 11 is not limited to a keyboard. For example, the input means 11 may be an input interface for receiving data from another device. The output means 16 is an output device such as a display device. However, the form of the output means 16 is not limited to a display device. For example, the output means 16 may be an output interface for transmitting data to another device.

The data processor 100 includes clustering means 13, cooccurrence degree calculation means 1, and classification hierarchy update means 15.

The data storage device 101 includes classification hierarchy storage means 12 for storing hierarchical relationship of classifications (hereinafter denoted as classification hierarchy). The classification hierarchy is a hierarchy representing hierarchical relationship of classifications. For example, the classification hierarchy is represented as a directed graph structure in which classification is denoted as a node. In the explanation below, the classification hierarchy is represented as an effective graph structure in which classification is a node. However, the classification hierarchy is not limited to the above structure. The classification hierarchy may be another structure capable of representing a hierarchical relationship of each classification. The classification hierarchy storage means 12 may be, for example, achieved with a magnetic disk device and the like of the data storage device 101. The above means respectively operates as follows.

The input means 11 receives the input data group and the classifications of respective data, and notifies the clustering means 13 of the data group. FIG. 2 is an explanatory diagram illustrating an example of an input data group and classifications thereof. In the example as shown in FIG. 2, data and a classification to which the data belongs (which may be hereinafter referred to as data classification, or simply "classification") are represented in one record, and the entire table including the record represents a data group. In the table, " . . . " represents an omission. In the example as shown in FIG. 2, a plurality of classifications delimited with "," (comma) represent classifications to which respective data belong. For example, this indicates that "text data 1" in the first record belong to classifications "F", "G" and "H".

The clustering means 13 receives the data group and the classifications of respective data from the input means 11, and clusters the received data group. The clustering means 13 may cluster the data group using, for example, a clustering method such as K-MEANS. It should be noted that the clustering means 13 may use methods other than K-MEANS as the clustering method.

Subsequently, the clustering means 13 adds up the data within each cluster for each classification, and makes a classification including many data into a group for each cluster. For example, the clustering means 13 generates a cross-tabulation table by using a classification corresponding to respective data within each cluster. More specifically, the clustering means 13 respectively arranges information about clusters in a horizontal direction and information about classifications in a vertical direction, and generates a cross-tabulation table adopting each cluster and the number of data of classifications as values. Then, the clustering means 13 looks up the summation table to mark portions where the number of data is large, and the marked portions are made into a group for each cluster.

Subsequently, the clustering means 13 looks up the classification hierarchy, and when a set of classification marked within the cluster (i.e., classification made into a group) is far in terms of hierarchy, this set of classification is divided. Then, the clustering means 13 notifies the cooccurrence degree calculation means 14 of a group of classification generated based on the divided result (hereinafter referred to as classification group).

The cooccurrence degree calculation means 14 receives the classification group, and calculates the degree of cooccurrence for each combination of two classifications selected from the classification group. In this case, cooccurrence means that both of two classifications occur in (belong to) one datum. The degree of cooccurrence is a statistical amount calculated based on the cooccurrence, and is a value representing the degree of cooccurrence. The cooccurrence degree calculation means 14 calculates the degree of cooccurrence of each classification by adopting, for example, the number of data in which two classifications cooccurs as denominator and the number of data belonging to each classification as a numerator. For example, the number of data in which classification "F" and classification "G" cooccur is assumed to be 10, and the number of data of classification "G" is assumed to be 9. At this occasion, the cooccurrence degree calculation means 14 calculates the degree of cooccurrence Pas follows, for example: P (classification "F", classification "G"|classification "G")=9/10=0.9. In the explanation below, the number of data in which two classifications cooccur is denoted as a cooccurrence frequency. In the above example, a cooccurrence frequency of the classification "F" and the classification "G" is 10.

The classification hierarchy update means 15 uses the classification group and the degree of cooccurrence to generate the hierarchical relationship of the classification and update the classification hierarchy by integrating the classifications. First, the classification hierarchy update means 15 retrieves one classification group, and retrieves two classifications from among the classification group. When the retrieved two classifications include the degree of cooccurrence equal to or more than a predetermined threshold value, and further satisfy inclusion relationship, the classification hierarchy update means 15 generates a hierarchical relationship between the two classifications from a parent to a child. On the other hand, when the two retrieved classifications have the degree of cooccurrence equal to or more than the predetermined threshold value and satisfy same-meaning relationship, the classification hierarchy update means 15 integrates the two classifications. The classification hierarchy update means 15 updates the classification hierarchy by repeating the above processing on a combination of two classifications within the group and all the classification groups.

In this case, the inclusion relationship means a relationship in which one of concepts indicated by two classifications is wide and the other of them is narrow, wherein the wide concept includes the narrow concept. On the other hand, the same-meaning relationship means a relationship in which both of concepts indicated by two classifications is included the same wide concept. In other words, the classification hierarchy update means 15 uses the degree of cooccurrence to determine whether the two classifications are in inclusion relationship or same-meaning relationship, and updates the classification hierarchy based on the relationship thus determined.

The outputs means 16 outputs the contents of the updated classification hierarchy to the display device and the like.

The clusterin means 13, the cooccurrence degree calculation means 14, and the classification hierarchy update means 15 are achieved with a CPU of a computer operating according to a program (classification hierarchy regeneration program). For example, the program may be stored in a storage unit (not shown) of the data processor 100, and the CPU may read the program and may operate as the clustering means 13, the cooccurrence degree calculation means 14 and the classification hierarchy update means 15 in accordance with the program. Alternatively, the clustering means 13, the cooccurrence degree calculation means 14, and the classification hierarchy update means 15 may be respectively achieved with dedicated hardware.

Subsequently, operation will be explained. FIG. 3 is a flowchart illustrating an example of operation of the data processor 100 according to this embodiment.

First, when the input means 11 notifies the clustering means 13 of the received data group, the clustering means 13 performs clustering based on the data group (step S1). The clustering means 13 may use a clustering method suitable for the received data as a method of clustering. For example, the clustering means 13 may use a well-known method such as K-MEANS. In the explanation about this embodiment, the clustering means 13 clusters text data, but the data group to be clustered is not limited to text data. For example, the clustering means 13 may cluster binary data such as audio and images as data groups.

Figure 4:
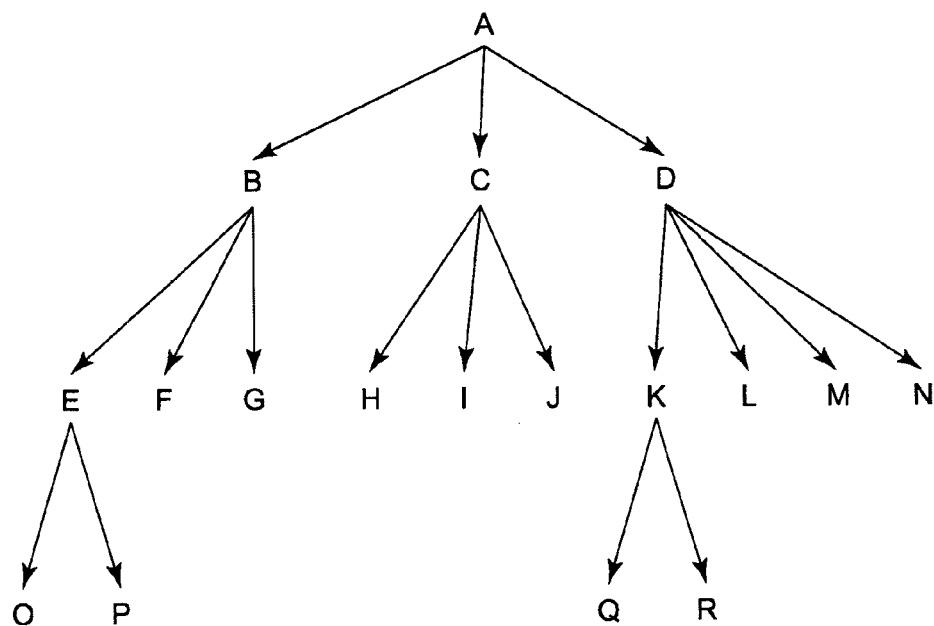
FIG. 4 is an explanatory diagram illustrating an example of a classification hierarchy.

Subsequently, the clustering means 13 looks up the classification hierarchy stored in the classification hierarchy storage means 12, generates a cross-tabulation table of data classifications and clusters thus clustered, and generates a classification group (step S2). FIG. 4 is an explanatory diagram illustrating an example of a classification hierarchy. FIG. 5 is an explanatory diagram illustrating an example of a cross-tabulation table.

The example as shown in FIG. 4 indicates that a classification hierarchy is represented by a directed graph structure in which classification is a node. The example as shown in FIG. 5 indicates that the cross-tabulation table is constituted by a table in which information about clusters is arranged in a horizontal direction and information about classifications is arranged in a vertical direction. The values in the cross-tabulation table shown as examples in FIG. 5 represent the number of data existing in a cluster which belong to a classification (i.e., a value obtained by adding up the number of data within a cluster which belong to each classification), but this is merely an example. For example, a value obtained by dividing the number of data by the total number of data in a cluster may be used, and a value obtained by dividing the number of data by the total number of data in a classification may be used.

In this case, the clustering means 13 marks a cell having a value equal to or more than a certain threshold value. In the example as shown in FIG. 5, a marked portion is indicated as being enclosed by a thick line, which indicates that the clustering means 13 marks a cell having a value equal to or more than a threshold value 10. The marked portion represents a classification in which there are many data included in a cluster. For example, "cluster 1" shown as an example in FIG. 5 indicates that there are many data which belong to classification H, classification I, and classification J included therein. In this case, when there are many data which belong to a classification, this means that the value is equal to or more than a threshold value defined in advance.

The clustering means 13 generates a classification group based on classifications marked for each cluster. For example, in the example as shown in FIG. 5, the clustering means 13 puts classifications marked in "cluster 2" (classification H, classification I and classification J) into one group (a set of classification). Subsequently, the clustering means 13 looks up the cross-tabulation table and the classification hierarchy, and divides the set of classification in which the hierarchical distance is far (step S3). The clustering means 13 determines whether the hierarchical distance in each classification in the set of classification is equal to or more than the threshold value. Then, when the hierarchical distance is equal to or more than the threshold value, the clustering means 13 divides the set of classification. In this case, the hierarchical distance is an index representing the degree of interval between the hierarchical classifications, and in this embodiment, the hierarchical distance is considered to mean the number of minimum hops within a classification hierarchy of two classifications.

Hereinafter, a method will be explained with reference to FIGS. 4 and 5, where the clustering means 13 divides the set of classification when the threshold value is 5 hops. In the example as shown in FIGS. 4 and 5, in the set of classification "cluster 3" (classification O, classification P, classification Q, classification R), classification O and classification Q, classification O and classification R, classification P and classification Q, and classification P and classification R are away by six hops, and therefore, they are adopted as dividing targets. The above classification pair is respectively divided into separate groups, i.e., (classification O, classification P) and (classification Q, classification R). FIG. 6 shows an example of a result obtained by dividing a cross-tabulation table. In the example as shown in FIG. 6, the set of classification "cluster 3" (classification O, classification P, classification Q, classification R) is divided into a classification group of "cluster 3" (classification O, classification P) and a classification group of "cluster 3'" (classification Q, classification R). In the explanation below, a cluster number shown as an example in FIG. 6 is described as a number of classification group (hereinafter referred to as group number).

Subsequently, the cooccurrence degree calculation means 14 calculates the degree of cooccurrence of two classifications selected from the classification group (step S4). FIG. 7 is an explanatory diagram illustrating an example of a calculation result of the degree of cooccurrence. The table shown as an example in FIG. 7 is a table including group numbers, "classification 1" and "classification 2", i.e., two classifications of which the degree of cooccurrence is to be calculated, and "cooccurrence score 1" and "cooccurrence score 2" respectively indicating the degrees of cooccurrences of the classifications. In the explanation below, "cooccurrence score 1" and "cooccurrence score 2" representing the degrees of cooccurrences are conditional probabilities of cooccurrences of "classification 1" and "classification 2", respectively. In other words, the "cooccurrence score 1" is a probability of cooccurrence with "classification 1", and the "cooccurrence score 2" is a probability of cooccurrence with "classification 2". The value of the "cooccurrence score 1" can be calculated from (expression 1) below, and the value of the "cooccurrence score 2" can be calculated from (expression 2) below.

cooccurrence score $1 = P$(classification 1,classification 2|classification 1)=cooccurrence frequency of classification 1 and classification 2/frequency of classification 1     (Expression 1)

cooccurrence score $2 = P$(classification 1,classification 2|classification 2)=cooccurrence frequency of classification 1 and classification 2/frequency of classification 2     (Expression 2)

The cooccurrence degree calculation means 14 determines whether two classifications are in inclusion relationship or same-meaning relationship, based on these two values (i.e., cooccurrence score 1 and cooccurrence score 2).

For example, when one of the cooccurrence score 1 and the cooccurrence score 2 is high, it is considered that there is inclusion relationship between a classification corresponding to a high score and the other of the classifications. When both of the cooccurrence score 1 and the cooccurrence score 2 are high, it is considered that there is same-meaning relationship between both of the classifications. This is because a common portion serving as a numerator is the same, but classification frequencies of them both serving as denominators are different.

This will be explained more specifically using a case where the cooccurrence score 1 is high and the cooccurrence score 2 is low. When the cooccurrence score 1 is high, almost all of the data which belong to classification 1 also belong to classification 2. On the contrary, when the cooccurrence score 2 is small, the data which belong to classification 2 belong to various data in addition to classification 1. Therefore, it is considered that classification 2 is more than classification 1, and classification 2 includes classification 1. On the contrary, when the cooccurrence score 2 is high and the cooccurrence score 1 is low, it is considered that classification 1 includes classification 2.

On the other hand when both of cooccurrence scores (i.e., cooccurrence score 1 and cooccurrence score 2) are high, the classifications thereof (i.e., classification 1 and classification 2) tend to have the same data, and therefore, it is considered that classification 1 and classification 2 are of the same meaning.

Subsequently, the classification hierarchy update means 15 updates the classification hierarchy based on classification group and the degree of cooccurrence (step S5). When the result determined based on the degree of cooccurrence indicates that the relationship between the two classifications satisfies the inclusion relationship, the classification hierarchy update means 15 updates these two classifications as parent-child classifications. On the other hand when the relationship between the two classifications satisfies same-meaning relationship, the classification hierarchy update means 15 integrates these two classifications into one classification. The classification hierarchy update means 15 uses a threshold value to determine the level of the cooccurrence score. Hereinafter, this threshold value will be denoted as a cooccurrence score threshold value.

Hereinafter, the processing for updating the classification hierarchy will be explained using an example as shown in FIGS. 4 and 7. In this case, the cooccurrence score threshold value is assumed to be set in the system in advance. When the cooccurrence score threshold value is 0.7 or more, the classification hierarchy update means 15 determines the value is high. When the cooccurrence score threshold value is 0.3 or less, the classification hierarchy update means 15 determines the value is low.

Figure 8:
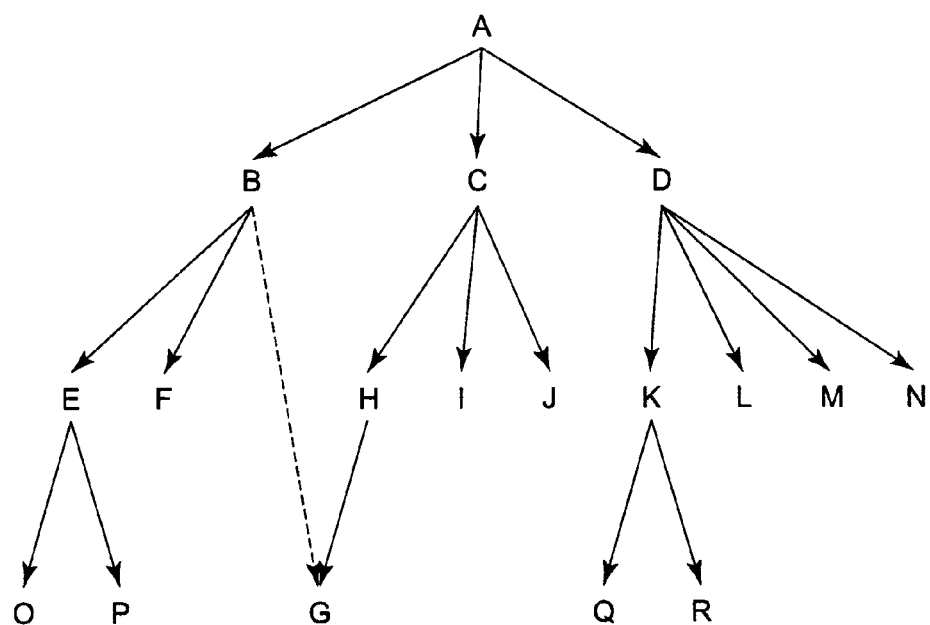
FIG. 8 is an explanatory diagram illustrating an example showing a step of updating a classification hierarchy.

According to cooccurrence scores of classification G and classification H in "group 1" shown as an example in FIG. 7, it is considered that "cooccurrence score 1" is high, and "cooccurrence score 2" is low. Therefore, these two classifications have inclusion relationship, and it can be understood that they are such relationship that classification H is a parent and classification G is a child. Therefore, the classification hierarchy update means 15 updates the classification hierarchy so as to make such relationship that classification H shown as an example in FIG. 4 becomes a parent and classification G therein becomes a child. FIG. 8 illustrates an example of a step of updating a classification hierarchy. In the example as shown in FIG. 8, it is understood that classification G is updated as a child of classification H. It should be noted that a broken line drawn from classification B to classification G is a line representing a parent-child relationship prior to update. The classification hierarchy update means 15 may delete or may not delete the parent-child relationship prior to the update. In the explanation below, the parent-child relationship prior to the update is assumed to be deleted later.

When cooccurrence scores of classification H and classification I in "group 2" shown as an example in FIG. 7 are seen, it is considered "cooccurrence score 2" is high and "cooccurrence score 1" is low. Therefore, it can be understood that these two classifications also have inclusion relationship, and have such relationship that classification H is a parent and classification I is a child. Likewise, from the cooccurrence scores of classification H and classification J, it can be understood that they are in such relationship that classification H is a parent and classification J is a child. On the other hand, both of classification I and classification J have high cooccurrence scores, and therefore, they are in same-meaning relationship. Therefore, the classification hierarchy update means 15 integrates these two classifications.

Figure 9:
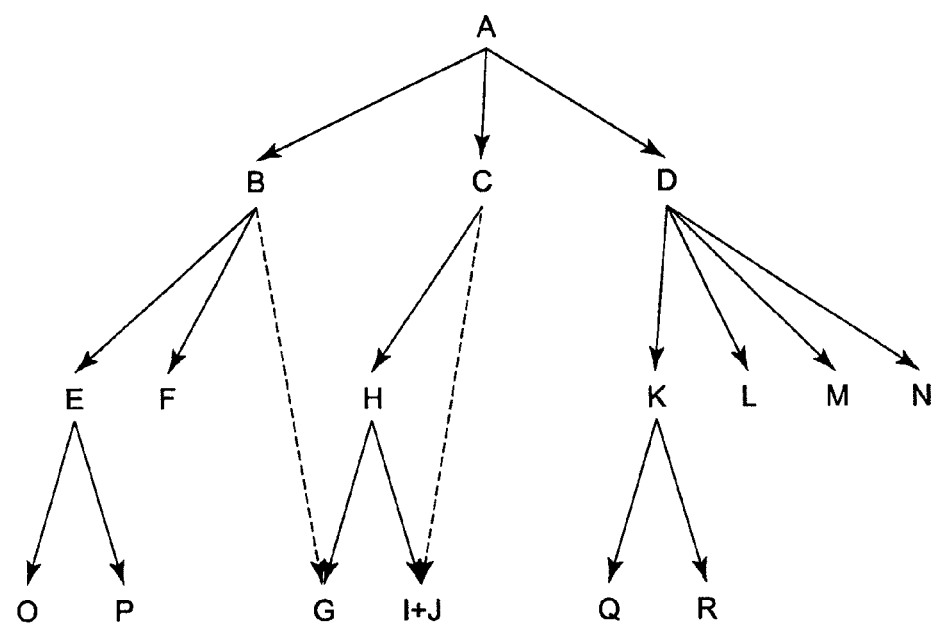
FIG. 9 is an explanatory diagram illustrating an example of a result in which the classification hierarchy has been updated.

FIG. 9 illustrates an example of a result in which a classification hierarchy is updated based on the classification group "group 2". The classification hierarchy shown as an example in FIG. 9 is updated with "group 1" and "group 2". It should be noted that, when the classifications in the same-meaning relationship are integrated, the classifications of them both may have different parent classifications. In this case, the classification hierarchy update means 15 generates a classification by integrating one of the two classifications having less amount of data included therein into a classification thereof having much amount of data included therein.

Since it can be understood that classification O and classification P in "group 3" shown as an example in FIG. 7 is in same-meaning relationship, the classification hierarchy update means 15 integrates these two classifications. On the other hand, classification Q and classification R in "group 3'" shown as an example in FIG. 7 are neither in inclusion relationship nor in same-meaning relationship, and accordingly, the classification hierarchy update means 15 does not update the classification hierarchy.

Figure 10:
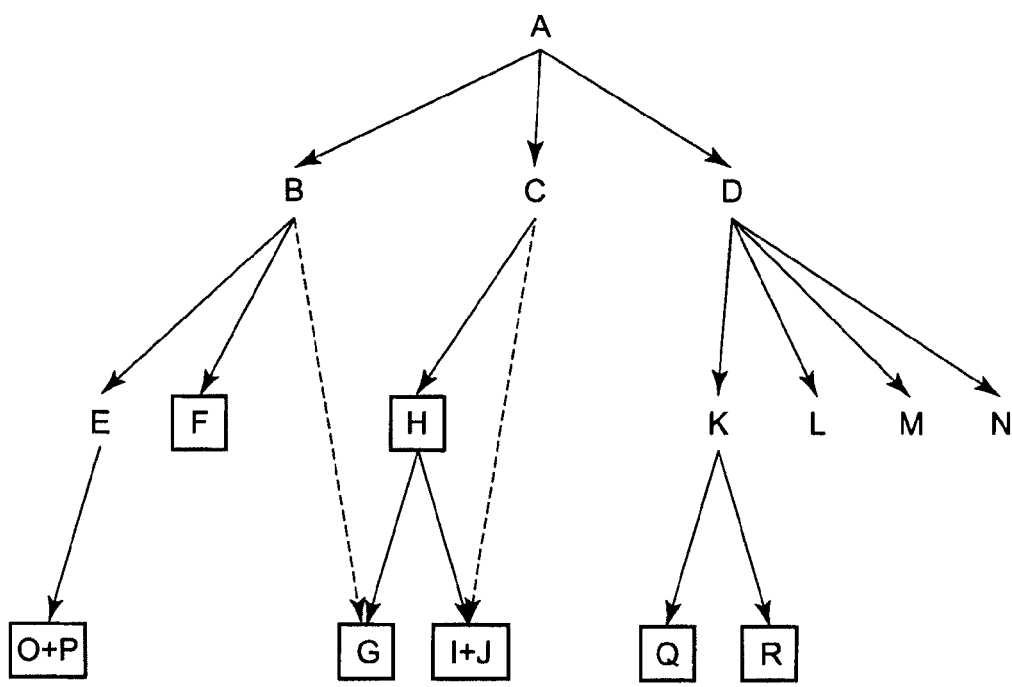
FIG. 10 is an explanatory diagram illustrating an example of an updated classification hierarchy.

FIG. 10 illustrates an example of a classification hierarchy updated as a result of the above. In this case, a classification enclosed by a thick line shown as an example in FIG. 10 is a classification having data which belong thereto. The classification hierarchy update means 15 may delete or may not delete the parent-child relationship prior to the update (relationship connected with a broken line in the figure). When the parent-child relationship prior to the update is left without being deleted, for example, it is possible to fulfill a request of, e.g., classifying data using the classification hierarchy prior to the update.

Further, the classification hierarchy update means 15 may perform processing on a classification having no data which belong thereto. For example, when a classification having no data which belong thereto does not have any child classification, the classification hierarchy update means 15 may delete the classification. For example, in the example as shown in FIG. 10, classification L, classification M, and classification N do not have any data which belong thereto, and accordingly, the classification hierarchy update means 15 may delete these classifications.

Figure 11:
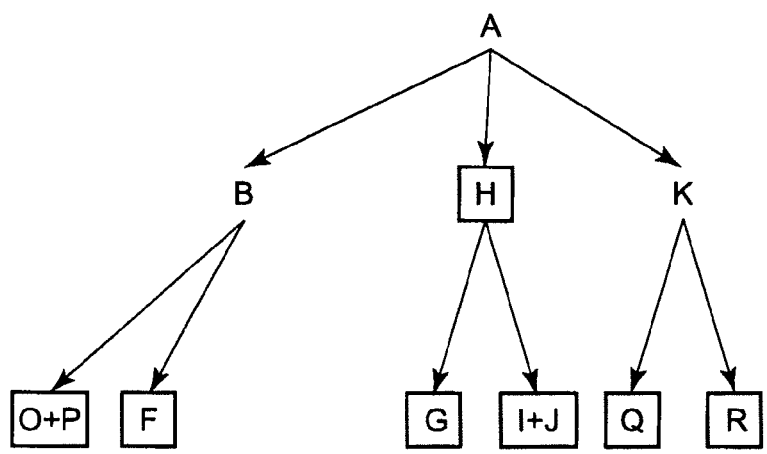
FIG. 11 is an explanatory diagram illustrating an example of an updated classification hierarchy.

In addition, the classification hierarchy update means 15 may delete a classification having no data belonging to classification and having only one child classification, and may generate a hierarchical relationship between a parent classification and a child classification of the deleted classification. In other words, the classification hierarchy update means 15 may generate a hierarchical relationship in which the grandchild classification is made into a child classification. This is because there is no meaning to hold such hierarchy of classification that has only one child classification. For example, classification E has only classification O+P as a child, and accordingly, the classification hierarchy update means 15 deletes classification E, and directly generates a hierarchical relationship between classification B and classification O+P. FIG. 11 is an example of a classification hierarchy updated as a result of the above.

As described above, according this embodiment, the clustering means 13 clusters the data group associated with the hierarchical classification. Further, the clustering means 13 generates a classification group obtained by extracting classifications satisfying a condition defined in advance (for example, a condition that "the number of data belonging thereto is large") from among classifications corresponding to the respective data within a cluster. Further, when the cooccurrence degree calculation means 14 calculates the degree of cooccurrence of the two classifications selected from the classification group, the classification hierarchy update means 15 regenerates a classification hierarchy based on the classification group and the degree of cooccurrence. Therefore, when a new classification hierarchy is generated by restructuring an existing classification hierarchy, a classification hierarchy in view of hierarchical relationship of classifications and a classification hierarchy integrating classifications of the same meaning can be efficiently generated.

In other words, according to this embodiment, the classification hierarchy update means 15 generates a hierarchical relationship of classifications and integrates classifications based on the degree of cooccurrence of classifications within a classification group, and therefore, the hierarchical relationship of the classification hierarchy can be generated, and classifications can be integrated, in view of the characteristics of data. In addition, according to this embodiment, the clustering means 13 generates a group of similar classifications in advance, and the cooccurrence degree calculation means 14 calculates only the degree of cooccurrence within the group. Therefore, the classification hierarchy can be updated efficiently in view of the characteristics of data.

Second Embodiment

FIG. 12 is a block diagram illustrating an example of a classification hierarchy regeneration system according to the second embodiment of this invention. The second embodiment is different from the first embodiment in that the input means 11 is replaced with second input means 21 and the clustering means 13 is replaced with second clustering means 23. It should be noted that the same configurations as those of the first embodiment are denoted with the same reference numerals as those of FIG. 1, and explanation thereabout is omitted.

A classification hierarchy regeneration system according to this embodiment includes a data processor 100, a data storage device 101, the second input means 21, and output means 16. The data storage device 101 is the same as that of the first embodiment, and the form of the second input means 21 is the same as the input means 11 according to the first embodiment. The second input means 21 receives an input data group having a structure and classifications of respective data. In the explanation below, data with a structure means data attached with a name for distinguishing each portion of structured data (hereinafter referred to as structure portion name).

FIG. 13 is an explanatory diagram illustrating an example of data with a structure. FIG. 13 is an example of patent data. The patent data includes structure information such as an abstract, an object, and a problem to be solved in advance. The second input means 21 receives the data with the structure as one datum. In the explanation above, the second input means 21 receives text data as the data with a structure. Alternatively, the second input means 21 may receive audio data, image data, and the like. In a case of audio data, the data with a structure may be a speech unit of a particular speaker of sound, or in a case of image data, the data with a structure may be a particular person of an image.

In addition, the second input means 21 also receives a structure portion name which the second clustering means 23 explained later adopts as an analysis target (target of clustering). The structure portion name can be called the name of structure information. In the example as shown in FIG. 13, the structure portion names include an abstract, an object, a problem to be solved, and the like. The second input means 21 may receive a plurality of structure portion names. For example, the second input means 21 may receive two structure portion names, i.e., "problem to be solved" and "object of invention".

The data processor 100 includes the second clustering means 23, cooccurrence degree calculation means 14, and classification hierarchy update means 15. The cooccurrence degree calculation means 14 and the classification hierarchy update means 15 are the same as those of the first embodiment, and explanation thereabout is omitted.

The second clustering means 23 receives a data group with the structure, classifications of the respective data, and the structure portion names from the second input means 21, and clusters the data group with the structure. More specifically, the second clustering means 23 does not cluster the entire data with the structure. The second clustering means 23 extracts only portions corresponding to the received structure portion names from the respective data, and performs clustering based on information about the extracted portions. For example, the second clustering means 23 extracts texts in portions corresponding to "problem to be solved" and "object of invention" from the data with the structure having the structure shown as an example in FIG. 13, determines the degree of similarity using only the texts in these portions, and performs clustering. The second clustering means 23 may cluster the data group using a clustering method such as K-MEANS. It should be noted that the second clustering means 23 may use methods other than K-MEANS as the clustering method.

When the data with the structure are audio data, and particular speaker names are received as structure portion names, for example, the second clustering means 23 may extract waveforms of portions corresponding to these speaker names, may calculate the degree of similarity, and may perform clustering. When the data with the structure are image data, and particular persons' names are received as structure portion names, the second clustering means 23 may extract only regions of images in which the persons are appearing, may calculate the degree of similarity, and may perform clustering.

The second clustering means 23, the cooccurrence degree calculation means 14 and the classification hierarchy update means 15 are achieved with a CPU of a computer operating according to a program (classification hierarchy regeneration program). Alternatively, the second clustering means 23, the cooccurrence degree calculation means 14, and the classification hierarchy update means 15 may be respectively achieved with dedicated hardware.

Subsequently, operation will be explained. Operation of the data processor 100 in this embodiment is the same as that in the flowchart shown as an example in FIG. 3. The second embodiment is the same as the first embodiment in that the second clustering means 23 receives the data group with the structure, the classifications of the respective data, and the structure portion names from the second input means 21, and clusters the data group with the structure. More specifically, in the first embodiment, the clustering means 13 performs clustering based on the entire data. On the other hand, in the second embodiment, the second clustering means 23 extracts only portions corresponding to the received structure portion names from the respective data, and performs clustering based on information about the extracted portions. Operation other than the above is the same as that of the first embodiment.

As described above, according to this embodiment, the second clustering means 23 clusters the data group with the structure using the data of the portions corresponding to the structure portion names extracted from the data with the structure, based on the data with the structure and the structure portion names. Therefore, in addition to the effects of the first embodiment, the classification hierarchy can be regenerated from the viewpoint where the user wants to analyze.

In other words, according to this embodiment, the second clustering means 23 performs clustering upon extracting only the portions serving as the analysis target. More specifically the clustering is performed using the data with a structure and the structure portion names serving as the analysis target. Therefore, the classification hierarchy can be updated from the viewpoint where the user wants to analyze. As described above, the classification group can be changed by changing the analysis target. Therefore, the feature indicated by the portions of the analysis target can be reflected in the classification hierarchy. For example, when the target data are patent data, the classification hierarchy can be updated from the view point of dividing according to the purposes, dividing according to the problems to be solved, and the like.

Third Embodiment

Figure 14:
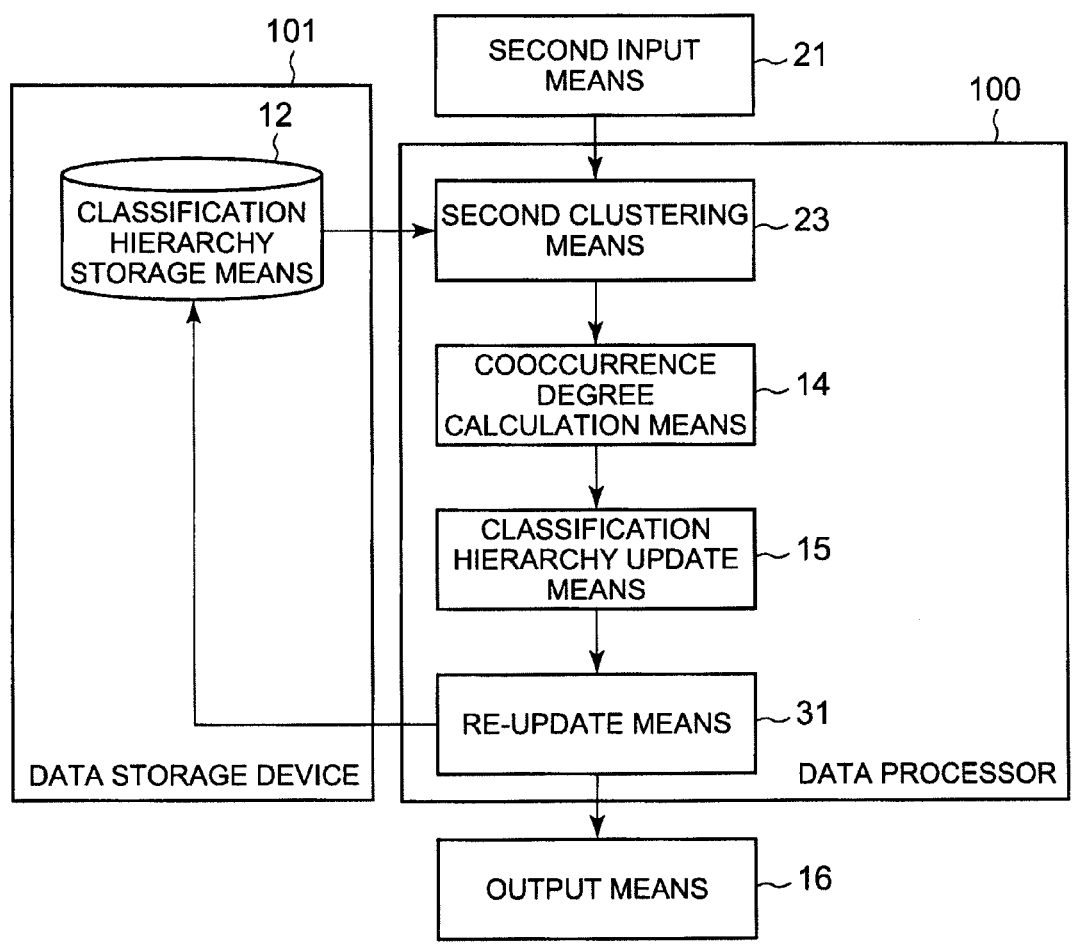
FIG. 14 is a block diagram illustrating an example of a classification hierarchy regeneration system according to the third embodiment of this invention.

FIG. 14 is a block diagram illustrating an example of a classification hierarchy regeneration system according to the third embodiment of this invention. The third embodiment is different from the first embodiment in that a data processor 100 includes re-update means 31. It should be noted that the same configurations as those of the first embodiment are denoted with the same reference numerals as those of FIG. 1, and explanation thereabout is omitted. That is, the data processor 100 according to the third embodiment includes clustering means 13, cooccurrence degree calculation means 14, classification hierarchy update means 15, and the re-update means 31. The clustering means 13, the cooccurrence degree calculation means 14, and the classification hierarchy update means 15 are the same as those of the first embodiment, and explanation thereabout is omitted.

The re-update means 31 receives a classification hierarchy of an update result from the classification hierarchy update means 15. When the received classification hierarchy does not satisfy a predetermined condition, the re-update means 31 instructs re-update of the classification hierarchy. In this case, the predetermined condition is at least one of the number of classifications and the depth of the classification hierarchy, the number of re-updates, and presence/absence of stop instruction given by a user, or a combination thereof. However, the predetermined condition is not limited to these contents.

More specifically, the re-update means 31 rewrites the classification hierarchy and the classifications of the data group with the updated classification hierarchy. The re-update means 31 changes a threshold value for the clustering and a threshold value with which the classification hierarchy update means 15 determines inclusion relationship and same-meaning relationship (i.e., cooccurrence score threshold value) to alleviated values. Then, the re-update means 31 instructs the clustering means 13 to regenerate the classification hierarchy.

The clustering means 13, the cooccurrence degree calculation means 14, the classification hierarchy update means 15, and the re-update means 31 are achieved with a CPU of a computer operating according to a program (classification hierarchy regeneration program). Alternatively, the clustering means 13, the cooccurrence degree calculation means 14, the classification hierarchy update means 15, and the re-update means 31 may be respectively achieved with dedicated hardware.

Figure 15:
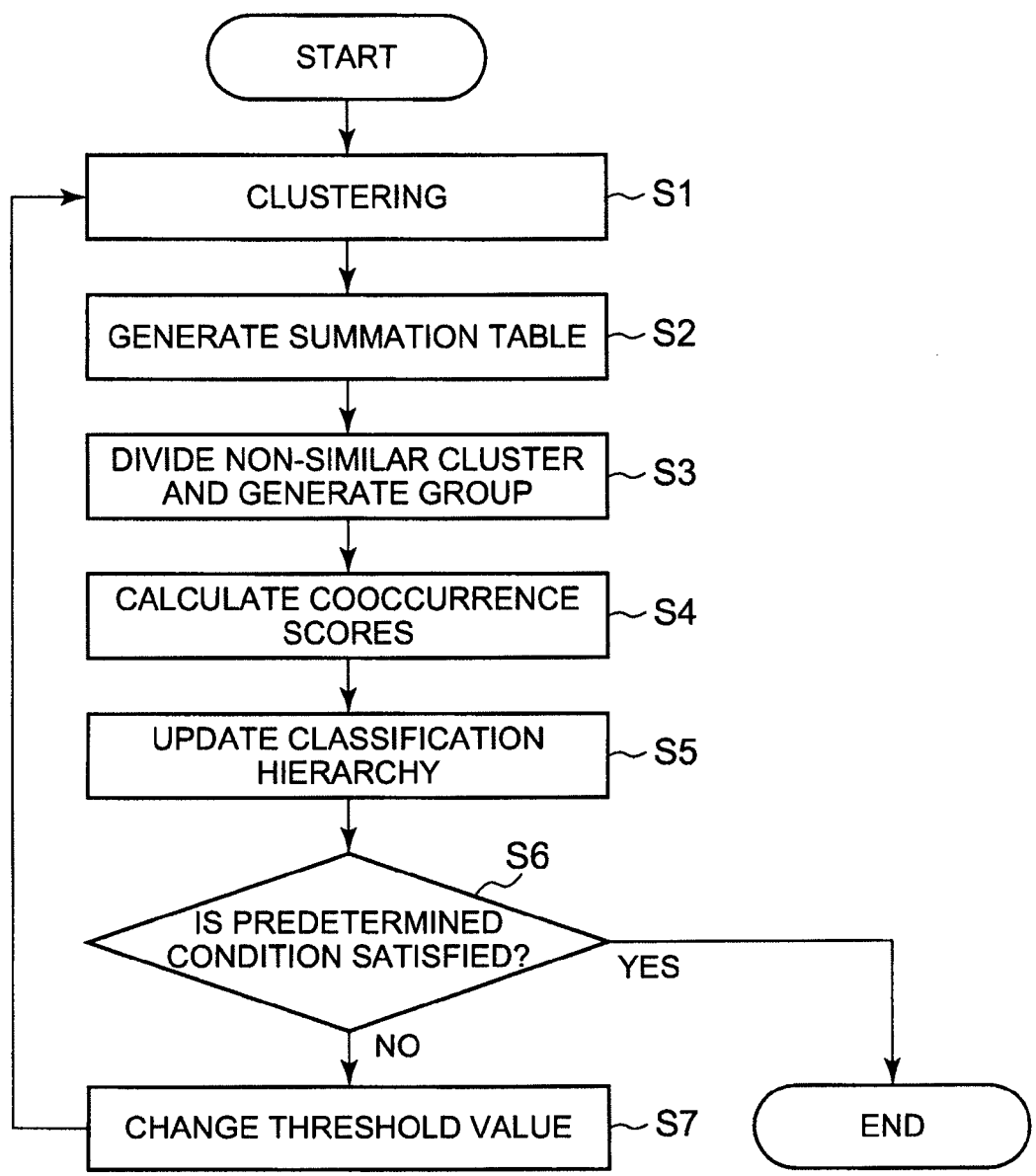
FIG. 15 is a flowchart illustrating an example of operation of a data processor 100 according to the third embodiment.

Subsequently, operation will be explained. FIG. 15 is a flowchart illustrating an example of operation of the data processor 100 according to this embodiment. The processings from the step of causing input means 11 to receive data and to the step of causing the classification hierarchy update means to update the classification hierarchy are the same as the processings from steps S1 to S5 of FIG. 3, and explanation thereabout is omitted. The re-update means 31 receives a classification hierarchy of an update result from the classification hierarchy update means 15, and determines whether the received classification hierarchy satisfies a predetermined condition or not (step S6). When the predetermined condition is not satisfied (NO in step S6), the re-update means 31 changes a threshold value for the clustering and a cooccurrence score threshold value to alleviated values (step S7), and instructs the clustering means 13 to regenerate the classification hierarchy. Subsequently, the processings from steps S1 to S6 are repeated. On the other hand, when the predetermined condition is satisfied (YES in step S6), the re-update means 31 terminates the update processing.

As described above, according to this embodiment, the re-update means 31 instructs the classification hierarchy update means 15 to re-update the regenerated classification hierarchy. More specifically, when the regenerated classification hierarchy does not satisfy the condition defined in advance, the re-update means 31 changes the condition of the degree of cooccurrence for regenerating the hierarchy of classifications and the condition for generating the classification group. Then, the clustering means 13 generates the classification group obtained by extracting classifications satisfying the changed condition, and the classification hierarchy regeneration means 15 regenerates the hierarchy of classifications based on the changed condition. Therefore, in addition to the effects of the first embodiment, a classification hierarchy closer to the condition can be obtained. In other words, even when the condition is not satisfied, the re-update means 31 performs the update again, thus obtaining a classification hierarchy closer to the condition.

EXAMPLE

Hereinafter, this invention will be explained using more specific examples. However, the scope of this invention is not limited to the contents explained below. In this example, explanation will be made using specific examples with reference to the block diagram shown as an example in FIG. 1 and the flowchart shown as an example in FIG. 3.

First, when the input means 11 notifies the clustering means 13 of the received data group, the clustering means 13 performs clustering based on the data group (step S1 of FIG. 3). FIG. 16 illustrates an example of a data group received by the input means 11. The data group shown as an example in FIG. 16 includes "data" and "classification" in one record. In the explanation about this example, text data are used as an example of data. However, the data may be audio, images, or the like. The classifications shown as an example in FIG. 16 are delimited with commas, which shows that a plurality of pieces are specified.

Hereinafter, a case will be explained where the clustering means 13 clusters the data. The clustering means 13 performs clustering using a clustering method suitable for the data. In this example, the received data are text data, and therefore, the clustering means 13 uses K-MEANS method to calculate the degree of similarity using texts of the respective data as vector data. More specifically, first, the clustering means 13 morphologically analyzes the texts of the respective data to divide the texts into words. Subsequently, the clustering means 13 converts the words into vector data in which the dimension is a word and the value is the number of words. Subsequently, the clustering means 13 generates K clusters from the degree of cosine similarity between the vector data. In this example, K is 4, and the clustering means 13 is assumed to generate four clusters.

When the received data are not text data but are binary data such as audio and images, the clustering means 13 may use a method suitable for each of the data. For example, in a case of audio data, the clustering means 13 reads the audio waveform data, and may perform clustering by performing calculation based on the degree of similarity. In a case of images, a color histogram is generated from an image, and the clustering may be performed by performing calculation based on the degree of similarity.

Figure 17:
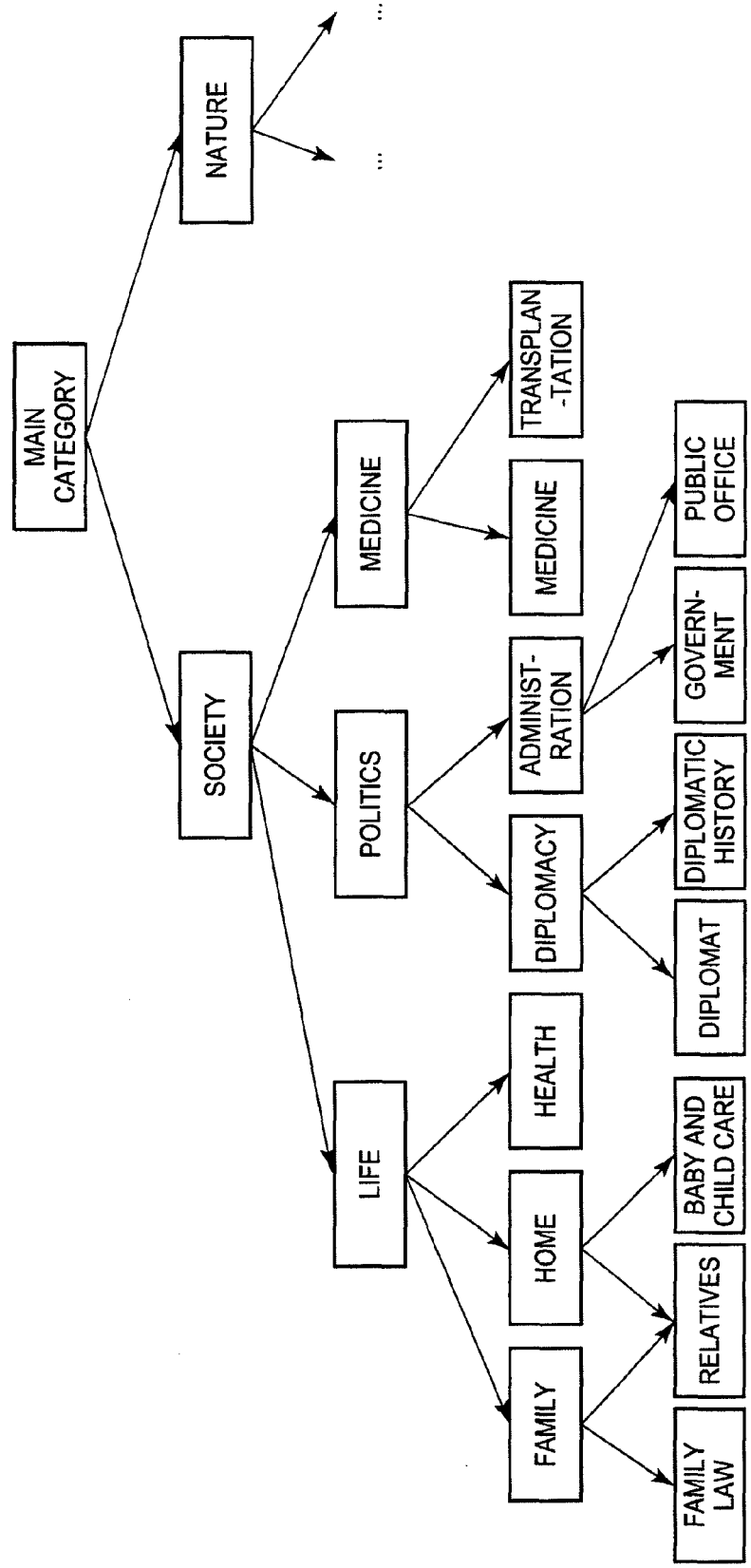
FIG. 17 is an explanatory diagram illustrating an example of a classification hierarchy.

Subsequently, the clustering means 13 looks up the classification hierarchy stored in classification hierarchy storage means 12, generates a cross-tabulation table of classifications and clusters of the clustering result, and generates a classification group (step S2 of FIG. 3). FIG. 17 shows an example of classification hierarchy. FIG. 18 shows an example of cross-tabulation table.

The classification hierarchy shown as an example in FIG. 17 is a directed graph structure in which classification is denoted as a node. In the example as shown in FIG. 17, the "main category" is a root classification. At a lower hierarchy of the classification, there are classifications "society" and "nature". Further, at a lower hierarchy of the classification "society", there are a wide variety of classifications.

The cross-tabulation table shown as an example in FIG. 18 is a table in which information about clusters is arranged in a horizontal direction and information about classifications is arranged in a vertical direction. A value of the cross-tabulation table shown as an example in FIG. 18 represents the number of data existing in a cluster and belonging to each classification. However, the values shown as an example in FIG. 18 are examples. A value obtained by dividing the number of data by the total number of data in a cluster may be used as the value, and a value obtained by dividing the number of data by the total number of data in a classification may be used as the value. In this example, only data belonging to classifications under the classification "society" are assumed to be input.

In this case, the clustering means 13 marks a cell having a value equal to or more than a certain threshold value. In the example as shown in FIG. 18, a marked portion is indicated as being enclosed by a thick line, which indicates that the clustering means 13 marks a cell having a value equal to or more than a threshold value 10. The marked portion represents a classification in which there are many data included in a cluster. For example, "cluster 1" shown as an example in FIG. 18 includes many data which belong to classification "transplantation" and classification "relatives". In this case, when there are many data which belong to a classification, this means that the value is equal to or more than a threshold value defined in advance.

The clustering means 13 generates a classification group based on classifications marked for each cluster. For example, in the example as shown in FIG. 18, the clustering means 13 makes classifications ("transplantation", "relatives") marked in the "cluster 1" into one group (a set of classification). In addition, the clustering means 13 respectively generates a group of ("health", "medicine", "transplantation") from "cluster 2", generates a group of ("administration", "diplomat") from "cluster 3", and generates a group of ("home", "baby and child care") from "cluster 4".

Subsequently, the clustering means 13 looks up the cross-tabulation table and the classification hierarchy, and divides the set of classification in which the hierarchical distance is far (step S3 of FIG. 3). The clustering means 13 determines whether the hierarchical distance in each classification in the set of classification is equal to or more than the threshold value. Then, when the hierarchical distance is equal to or more than the threshold value, the clustering means 13 divides the set of classification. In this example, the hierarchical distance means the number of minimum hops within a classification hierarchy of two classifications.

Hereinafter, a case will be explained with reference to FIG. 17 where the threshold value is 5 hops. In the example as shown in FIG. 17, in a group of ("transplantation", "relatives"), "transplantation" and "classification" are away by five hops, and therefore, they are dividing targets. Therefore, this group is divided into ("transplantation") and ("relatives"). FIG. 19 shows an example of a result obtained by dividing a cross-tabulation table. In the example as shown in FIG. 19, it is understood that the classifications "transplantation" and "relatives" in "cluster 1" are respectively divided into "cluster 1" and "cluster 1'". In the explanation below, the cluster number shown as an example in FIG. 19 is denoted as the group number.

Subsequently, the cooccurrence degree calculation means 14 calculates the degree of cooccurrence of two classifications selected from the classification group (step S4 of FIG. 3). In this case, the degree of cooccurrence is a statistical amount based on the cooccurrence frequency of the two classifications. FIG. 20 is an example of a calculation result of cooccurrence scores. The table shown as an example in FIG. 20 includes "classification 1" and "classification 2", i.e., two classifications of which classification group number and the degree of cooccurrence are to be calculated, and also includes "cooccurrence score 1" and "cooccurrence score 2" indicating the degrees of cooccurrences of the respective classifications. In this example, "cooccurrence score 1" and "cooccurrence score 2" indicating the degrees of cooccurrences are respectively conditional probabilities where "classification 1" and "classification 2" cooccur. In other words, the "cooccurrence score 1" is a probability of cooccurrence with "classification 1", and the "cooccurrence score 2" is a probability of cooccurrence with "classification 2". The value of "cooccurrence score 1" and the value of "cooccurrence score 2" can be respectively calculated by the above (expression 1) and (expression 2).

More specifically, the value of the cooccurrence score is calculated as follows. The "classification group 1" and the "classification group 1'" include only one marked classification (i.e., a classification to which data having a value equal to or more than a threshold value). Therefore, the cooccurrence degree calculation means 14 does not calculate the cooccurrence score. On the other hand, the "classification group 1" and the "classification group 1'" have two marked classifications (i.e., classifications "health" and "medicine"). Therefore, the cooccurrence degree calculation means 14 calculates cooccurrence scores of two classifications "health", "medicine" in "classification group 2" as follows.

In this case, the number of times "health" and "medicine" are allocated to the same data (i.e., cooccurrence frequency of "health" and "medicine") is 16, the occurrence frequency of "health" is 21, and the occurrence frequency of "medicine" is 20. At this occasion, the respective cooccurrence scores are calculated as follows.

Cooccurrence score 1=$P$(health,medicine|
health)=cooccurrence frequency of "health" and
"medicine"/frequency of "health"=16/21=0.77

Cooccurrence score 2=$P$(health,medicine|
medicine)=cooccurrence frequency of "health"
and "medicine"/frequency of "medicine"=16/
20=0.8

It should be noted that the other cooccurrence scores are calculated in the same manner, and therefore, description thereabout is omitted.

Subsequently, the classification hierarchy update means 15 updates the classification hierarchy based on classification group and the degree of cooccurrence (step S5 of FIG. 3). The classification hierarchy update means 15 determines the level of the degree of cooccurrence (i.e., cooccurrence score) using the cooccurrence score threshold value. In this example, when the cooccurrence score is equal to or more than the cooccurrence score threshold value 0.7, the classification hierarchy update means 15 determines the cooccurrence score is high. When the cooccurrence score is equal to or less than the cooccurrence score threshold value 0.2, the classification hierarchy update means 15 determines the cooccurrence score is low.

According to the degrees of cooccurrences of "health" and "medicine" in "group 2" shown as an example in FIG. 20 (cooccurrence scores), it is determined that "cooccurrence score 1" is high and "cooccurrence score 2" is also high. Therefore, it is considered that these two classifications are in same-meaning relationship. As described above, the occurrence frequency of "health" is 21, the occurrence frequency of "medicine" is 20. Therefore, it is considered that "health" is a wider classification. Therefore, the classification hierarchy update means 15 updates the classification hierarchy by integrating "medicine" to "health".

On the other hand, neither of the degree of cooccurrence of "health" and "transplantation" in "group 2" shown as an example in FIG. 20 nor the degree of cooccurrence of "medicine" and "transplantation" in "group 2" is not considered to be high and is not considered to be low. Therefore, the classification hierarchy update means 15 does not update the classification hierarchy.

According to the degree of cooccurrence of "administration" and "diplomat" in "group 3" shown as an example in FIG. 20, "cooccurrence score 1" is determined to be low, and "cooccurrence score 2" is determined to be high. Therefore, it is considered these two classifications are in inclusion relationship. Therefore, the classification hierarchy update means 15 updates the classification hierarchy by adopting "administration" as a parent and "diplomat" as a child.

Likewise, in the degree of cooccurrence of "home" and "baby and child care" in "group 4" shown as an example in FIG. 20, "cooccurrence score 1" is determined to be high, and "cooccurrence score 2" is also determined to be high. Therefore, it is considered that these two classifications are in same-meaning relationship. In this case, when "home" is a wider classification, the classification hierarchy update means 15 updates the classification hierarchy by integrating "baby and child care" to "home".

Figure 21:
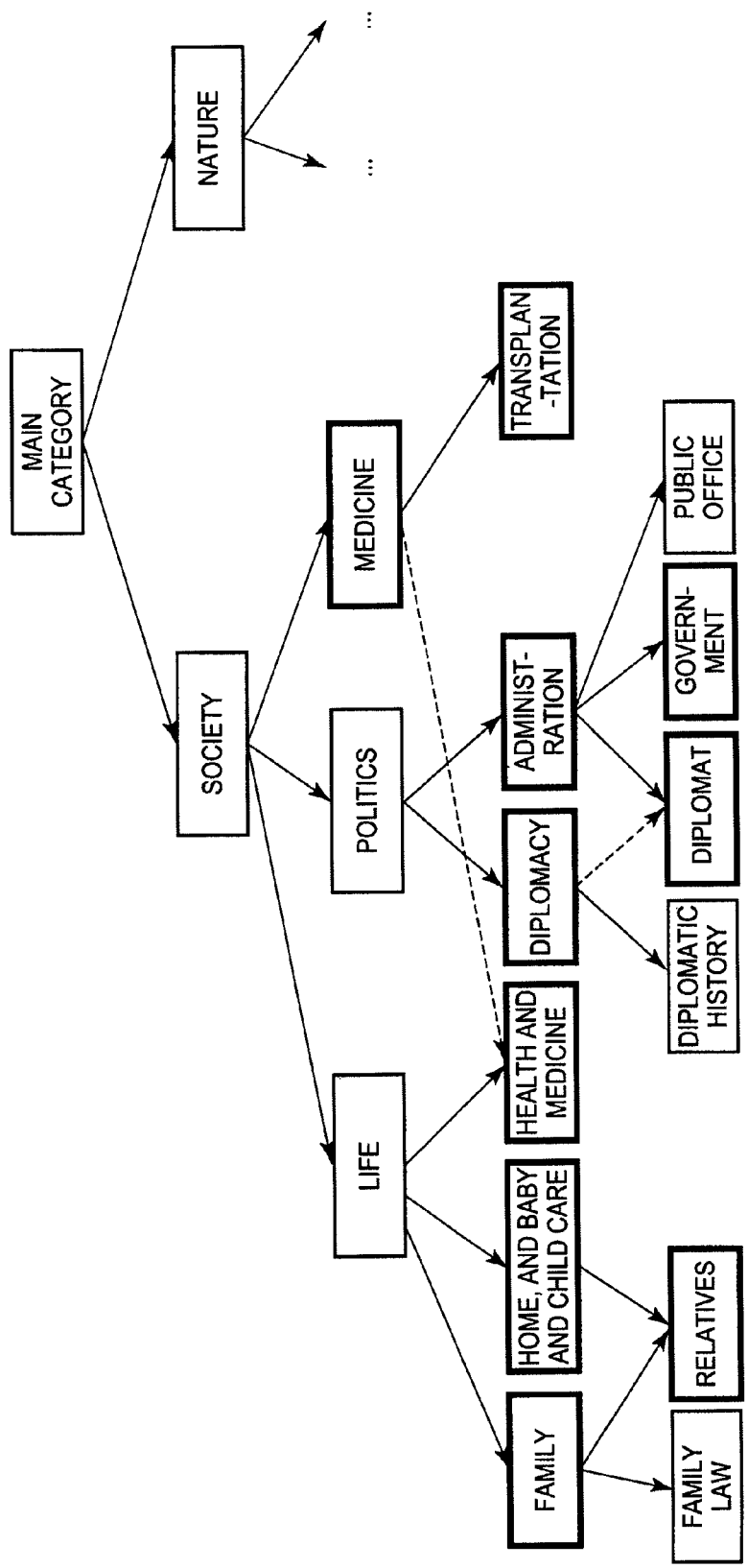
FIG. 21 is an explanatory diagram illustrating an example of a classification hierarchy.

FIG. 21 illustrates an example of a classification hierarchy obtained as a result of the above. A broken line as shown in FIG. 21 is a line indicating a parent-child relationship before the classification hierarchy is updated. In classifications shown as an example in FIG. 21, a classification having data which belong to the classification is indicated as being enclosed by a thick line, and a classification having no data in the classification is indicated without being enclosed by a thick line. It should be noted that the parent-child relationship prior to the update may be deleted or may not be deleted. In this example, the classification hierarchy update means 15 later deletes the parent-child relationship prior to the update.

Figure 22:
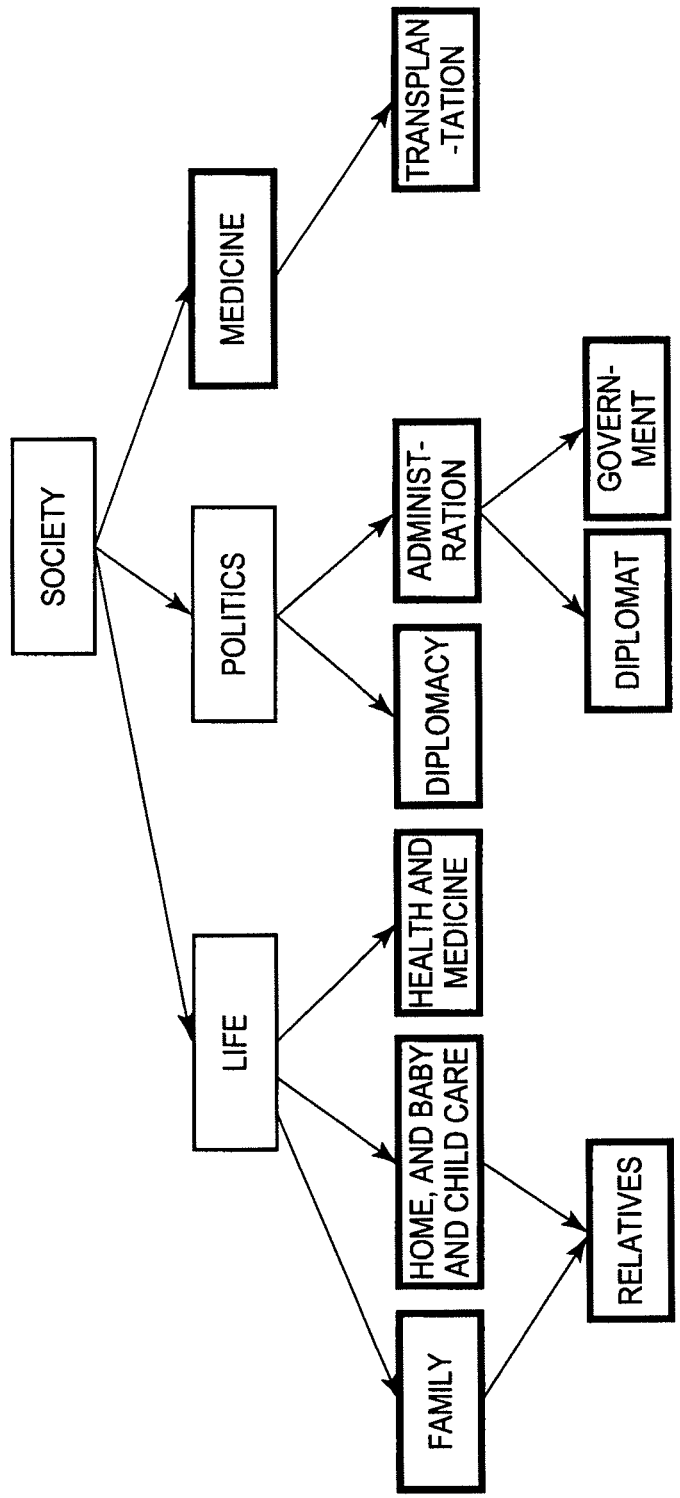
FIG. 22 is an explanatory diagram illustrating an example of a classification hierarchy.

Further, the classification hierarchy update means 15 may perform processing on a classification having no data which belong thereto. In this example, a classification having no data belonging thereto and having no child classification is deleted. For example, in the classifications shown as an example in FIG. 21, "family law", "diplomatic history", and "public office" are classifications having no data belonging to the classifications and having no child classification. Therefore, the classification hierarchy update means 15 updates the classification hierarchy by deleting these classifications. Alternatively, the classification hierarchy update means 15 may delete a classification having no data belonging to the classification and having only one child classification, may advance the child classification, and may directly generate the hierarchical relationship. However, in this example, there is no such classification, and therefore the classification hierarchy is not updated. FIG. 22 illustrates an example of a classification hierarchy obtained as a result of the above.

In addition, this invention can also be applied to a purpose of classifying and displaying a search result when information search result is displayed. This invention can also be applied even when a related word defined based on the relationship between the updated classification hierarchy and the words in the classification is displayed.

Figure 23:
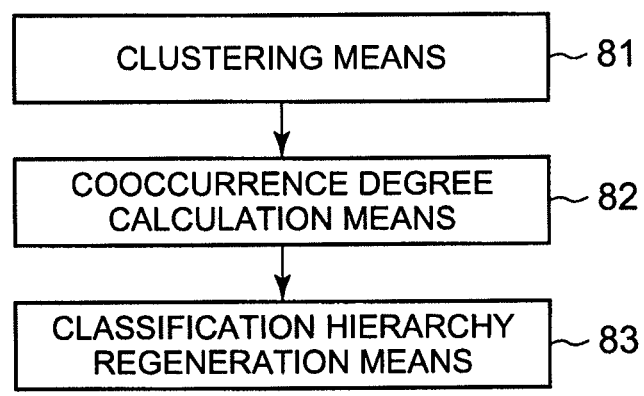
FIG. 23 is a block diagram illustrating a minimum configuration of this invention.

Subsequently, the minimum configuration of this invention will be explained. FIG. 23 is a block diagram illustrating a minimum configuration of this invention. A classification hierarchy regeneration system according to this invention includes clustering means 81 (for example, clustering means 13) for clustering a data group associated with a hierarchical classification, and generating a classification group (for example, a set of classification, classification group), i.e., a group obtained by extracting a classification satisfying a condition defined in advance (for example, a classification having many data belonging thereto) from classifications corresponding to respective data in a cluster, cooccurrence degree calculation means 82 (for example, cooccurrence degree calculation means 14) for calculating a degree of cooccurrence of two classifications selected from the classification group (for example, calculating with (expression 1), (expression 2)), and classification hierarchy regeneration means 83 (classification hierarchy update means 15) for regenerating a hierarchy of the classification (for example, classification hierarchy), based on the classification group and the degree of cooccurrence.

According to this configuration, when a new classification hierarchy is generated by restructuring an existing classification hierarchy, a classification hierarchy in view of hierarchical relationship of classifications and a classification hierarchy integrating classifications of the same meaning can be efficiently generated.

The classification hierarchy regeneration system at least shown below is considered to be described in any of the above embodiments.

(1) A classification hierarchy regeneration system including clustering means (for example, clustering means 13) for clustering a data group associated with a hierarchical classification, and generating a classification group (for example, a set of classification, classification group), i.e., a group obtained by extracting a classification satisfying a condition defined in advance (for example, a classification having many data belonging thereto) from classifications corresponding to respective data in a cluster, cooccurrence degree calculation means (for example, cooccurrence degree calculation means 14) for calculating a degree of cooccurrence of two classifications selected from the classification group (for example, calculating with (expression 1), (expression 2)), and classification hierarchy regeneration means (classification hierarchy update means 15) for regenerating a hierarchy of the classification (for example, classification hierarchy), based on the classification group and the degree of cooccurrence.

(2) The classification hierarchy regeneration system, wherein when classifications in the generated classification group are away by a distance defined in advance or more, the clustering means generates classification groups by dividing the classification group (for example, a set of classification).

(3) The classification hierarchy regeneration system, wherein the cooccurrence degree calculation means calculates the degree of cooccurrence, based on a cooccurrence frequency, i.e., the number of data in which two classifications cooccur, and the number of data belonging to each classification, the classification hierarchy regeneration means determines whether the above two classifications are in inclusion relationship or in same-meaning relationship, on the basis of the degree of cooccurrence, and the hierarchy of classification is regenerated on the basis of a determination result indicating whether the two classifications are in inclusion relationship or in same-meaning relationship.

(4) The classification hierarchy regeneration system, wherein when the relationship between the two classifications is in the inclusion relationship, the classification hierarchy regeneration means regenerates the hierarchy of classification by adding a hierarchy having an including classification as a parent classification and having an included classification as a child classification, and when the relationship between the two classifications is in the same-meaning relationship, the classification hierarchy regeneration means regenerates the hierarchy of classification by generating a classification obtained by integrating one of the two classifications having a smaller number of data included therein to a classification thereof having a larger number of data included therein.

(5) The classification hierarchy regeneration system, wherein when the hierarchy having the included classification as the child classification is added, the classification hierarchy regeneration means regenerates the hierarchy of classification by deleting a parent-child relationship of the child classification prior to regeneration of the classification hierarchy.

(6) The classification hierarchy regeneration system, wherein when a classification having no data belonging thereto is a classification having no child classification, the classification hierarchy regeneration means regenerates the hierarchy of classification by deleting the classification, and when the classification is a classification having no data belonging thereto and having only one child classification, the classification hierarchy regeneration means regenerates the hierarchy of classification by deleting the classification and generating a hierarchical relationship between a parent classification of the deleted classification and the child classification.

(7) The classification hierarchy regeneration system, wherein the clustering means (for example, second clustering means 23) clusters a data group with a structure using data obtained by extracting a portion corresponding to a structure portion name from the data with the structure, based on the data with the structure, i.e., structured data, and the structure portion name, i.e., a name for distinguishing each portion of the data with the structure.

(8) The classification hierarchy regeneration system further comprising re-update means (for example, re-update means 31) for giving an instruction of re-updating the classification hierarchy regenerated by the classification hierarchy regeneration means, wherein when the regenerated classification hierarchy does not satisfy a requirement defined in advance, the re-update means changes at least one condition of a condition of the degree of cooccurrence for regenerating the hierarchy of classification and a condition for generating a classification group, the clustering means generates a classification group obtained by extracting a classification satisfying the changed condition, and the classification hierarchy regeneration means regenerates the hierarchy of classification based on the changed condition.

(9) The classification hierarchy regeneration system, wherein when at least one requirement of the number of classifications of the classification hierarchy, the depth of the classification hierarchy, the number of re-updates of the classification hierarchy, and presence/absence of stop instruction does not satisfy the requirement defined in advance, the re-update means changes the condition.

(10) The classification hierarchy regeneration system, wherein the clustering means generates a classification group by extracting a classification in which the number of data belonging to the classification is more than a number defined in advance from the classifications corresponding to the respective data in the cluster.

The invention of this application has been hereinabove explained with reference to the embodiments and the example, but the invention of this application is not limited to the above embodiments and the example. The configuration and the details of the invention of this application can be changed in various ways which can be understood by a person skilled in the art without deviating from the scope of the invention of this application.

This application claims the priority based on Japanese patent application No. 2009-160071 filed on Jul. 6, 2009, and all the disclosures thereof are incorporated herein by reference.

Industrial Applicability

This invention can be suitably applied to a classification hierarchy regeneration system that generates a new classification hierarchy by restructuring a hierarchical classification.

Reference Signs List

11 Input means
12 Classification hierarchy storage means
13 Clustering means
14 Cooccurrence degree calculation means
15 Classification hierarchy update means 21 Second input means
23 Second clustering means
31 Re-update means
100 Data processor
101 Data storage device

The invention claimed is:

1. A classification hierarchy regeneration system comprising:
   a processor;
   a clustering unit which clusters a data group associated with a hierarchical classification, and generates a classification group obtained by extracting a classification which appears in a cluster with a frequency more than a number defined in advance from classifications corresponding to respective data in the cluster;
   a cooccurrence degree calculation unit which calculates, using the processor, a degree of cooccurrence of two classifications selected from the classification group; and
   a classification hierarchy regeneration unit which regenerates a hierarchy of the classification, based on the classification group and the degree of cooccurrence,
   wherein when classifications in the generated classification group are separated in the hierarchy of the classification by at least a predefined distance, the clustering unit generates classification groups by dividing the classification group,
   wherein the cooccurrence degree calculation unit calculates the degree of cooccurrence, based on a cooccurrence frequency which is the number of data in which two classifications cooccur, and the number of data belonging to each classification,
   wherein the classification hierarchy regeneration unit determines whether the above two classifications are in inclusion relationship or in same-meaning relationship, on the basis of the degree of cooccurrence,
   wherein the hierarchy of classification is regenerated on the basis of a determination result indicating whether the two classifications are in inclusion relationship or in same-meaning relationship, and
   wherein the clustering unit generates a classification group by extracting a classification in which the number of data belonging to the classification is more than a number defined in advance from the classifications corresponding to the respective data in the cluster.

2. The classification hierarchy regeneration system according to claim 1, wherein when the relationship between the two classifications is in the inclusion relationship, the classification hierarchy regeneration unit regenerates the hierarchy of classification by adding a hierarchy having an including classification as a parent classification and having an included classification as a child classification, and
   when the relationship between the two classifications is in the same-meaning relationship, the classification hierarchy regeneration unit regenerates the hierarchy of classification by generating a classification obtained by integrating one of the two classifications having a smaller number of data included therein to a classification thereof having a larger number of data included therein.

3. The classification hierarchy regeneration system according to claim 2, wherein when the hierarchy having the included classification as the child classification is added, the classification hierarchy regeneration unit regenerates the hierarchy of classification by deleting a parent-child relationship of the child classification prior to regeneration of the classification hierarchy.

4. The classification hierarchy regeneration system according to claim 1, wherein when a classification having no data belonging thereto is a classification having no child classification, the classification hierarchy regeneration unit regenerates the hierarchy of classification by deleting the classification, and
   when the classification is a classification having no data belonging thereto and having only one child classification, the classification hierarchy regeneration unit regenerates the hierarchy of classification by deleting the classification and generating a hierarchical relationship between a parent classification of the deleted classification and the child classification.

5. The classification hierarchy regeneration system according to claim 1, wherein the clustering unit clusters a data group with a structure using data obtained by extracting a portion corresponding to a structure portion name from the data with the structure, based on the data with the structure and the structure portion name which is a name for distinguishing each portion of the data with the structure.

6. The classification hierarchy regeneration system according to claim 1 further comprising a re-update unit which gives an instruction of re-updating the classification hierarchy regenerated by the classification hierarchy regeneration means,
   wherein when the regenerated classification hierarchy does not satisfy a requirement defined in advance, the re-update unit changes at least one condition of a condition of the degree of cooccurrence for regenerating the hierarchy of classification and a condition for generating a classification group,
   the clustering unit generates a classification group obtained by extracting a classification satisfying the changed condition, and
   the classification hierarchy regeneration unit regenerates the hierarchy of classification based on the changed condition.

7. The classification hierarchy regeneration system according to claim 6, wherein when at least one requirement of the number of classifications of the classification hierarchy, the depth of the classification hierarchy, the number of re-updates of the classification hierarchy, and presence/absence of stop instruction does not satisfy the requirement defined in advance, the re-update means changes the condition.

8. A classification hierarchy regeneration method comprising:
   clustering a data group associated with a hierarchical classification;
   generating a classification group obtained by extracting a classification which appears in a cluster with a frequency more than a number defined in advance from classifications corresponding to respective data in the cluster;
   calculating a degree of cooccurrence of two classifications selected from the classification group;
   regenerating a hierarchy of the classification, based on the classification group and the degree of cooccurrence;
   calculating the degree of cooccurrence based on a cooccurrence frequency which is the number of data in which two classifications cooccur, and the number of data belonging to each classification;
   determining whether the above two classifications are in inclusion relationship or in same-meaning relationship, on the basis of the degree of cooccurrence;

regenerating the hierarchy of classification on the basis of a determination result indicating whether the two classifications are in inclusion relationship or in same-meaning relationship; and generating the classification group by extracting a classification in which the number of data belonging to the classification is more than a number defined in advance from the classifications corresponding to the respective data in the cluster, wherein when classifications in the generated classification group are separated in the hierarchy of the classification by at least a predefined distance, the clustering unit generates classification groups by dividing the classification group.

9. The classification hierarchy regeneration method according to claim 8, further comprising: when the relationship between the two classifications is in the inclusion relationship, regenerating the hierarchy of classification by adding a hierarchy having an including classification as a parent classification and having an included classification as a child classification, when the relationship between the two classifications is in the same-meaning relationship, regenerating the hierarchy of classification by generating a classification obtained by integrating one of the two classifications having a smaller number of data included therein to a classification thereof having a larger number of data included therein.

10. The classification hierarchy regeneration method according to claim 9, further comprising: when the hierarchy having the included classification as the child classification is added, regenerating the hierarchy of classification by deleting a parent-child relationship of the child classification prior to regeneration of the classification hierarchy.

11. The classification hierarchy regeneration method according to claim 8, further comprising: when a classification having no data belonging thereto is a classification having no child classification, regenerating the hierarchy of classification by deleting the classification, and when the classification is a classification having no data belonging thereto and having only one child classification, regenerating the hierarchy of classification by deleting the classification and generating a hierarchical relationship between a parent classification of the deleted classification and the child classification.

12. The classification hierarchy regeneration method according to claim 8, further comprising: clustering a data group with a structure by using data obtained by extracting a portion corresponding to a structure portion name from the data with the structure, based on the data with the structure, and the structure portion name which is a name for distinguishing each portion of the data with the structure.

13. The classification hierarchy regeneration method according to claim 8, further comprising: changing at least one condition of a condition of the degree of cooccurrence for regenerating the hierarchy of classification and a condition for generating a classification group when the regenerated classification hierarchy does not satisfy a requirement defined in advance, and instructing to re-update the regenerated classification hierarchy, and wherein generating a classification group obtained by extracting a classification satisfying the changed condition, and regenerating the hierarchy of classification based on the changed condition.

14. The classification hierarchy regeneration method according to claim 13, further comprising: changing the condition when at least one requirement of the number of classifications of the classification hierarchy, the depth of the classification hierarchy, the number of re-updates of the classification hierarchy, and presence/absence of stop instruction does not satisfy the requirement defined in advance.

15. A non-transitory computer readable information recording medium storing a program which, when executed by a processor, performs a method comprising:

clustering a data group associated with a hierarchical classification, and generating a classification group obtained by extracting a classification which appears in a cluster with a frequency more than a number defined in advance from classifications corresponding to respective data in the cluster;

calculating a degree of cooccurrence of two classifications selected from the classification group;

regenerating a hierarchy of the classification, based on the classification group and the degree of cooccurrence;

calculating the degree of cooccurrence based on a cooccurrence frequency which is the number of data in which two classifications cooccur, and the number of data belonging to each classification;

determining whether the above two classifications are in inclusion relationship or in same-meaning relationship, on the basis of the degree of cooccurrence;

regenerating the hierarchy of classification on the basis of a determination result indicating whether the two classifications are in inclusion relationship or in same meaning relationship; and generating the classification group by extracting a classification in which the number of data belonging to the classification is more than a t umber defined in ad from the classifications corresponding to the respective data in the cluster, wherein when classifications in the generated classification group are separated in the hierarchy of the classification by at least a predefined distance, the clustering unit generates classification groups by dividing the classification group.

* * * * *

UNITED STATES PATENT AND TRADEMARK OFFICE
CERTIFICATE OF CORRECTION

PATENT NO. : 8,732,173 B2
APPLICATION NO. : 13/382381
DATED : May 20, 2014
INVENTOR(S) : Hironori Mizuguchi and Dai Kusui It is certified that error appears in the above-identified patent and that said Letters Patent is hereby corrected as shown below:

In the Specification

Column 5, Line 13: Delete "1," and insert -- 14, --

Column 6, Line 62: Delete "outputs" and insert -- output --

Column 6, Line 64: Delete "clusterin" and insert -- clustering --

In the Claims

Column 24, Line 46: Claim 15, delete "t umber" and insert -- number --

Column 24, Line 46: Claim 15, delete "ad" and insert -- advance --

Signed and Sealed this
Ninth Day of December, 2014

Michelle K. Lee
*Deputy Director of the United States Patent and Trademark Office*